United States Patent [19]

Johnson et al.

[11] Patent Number: 5,813,009
[45] Date of Patent: Sep. 22, 1998

[54] COMPUTER BASED RECORDS MANAGEMENT SYSTEM METHOD

[75] Inventors: Judy J. Johnson, New Brunswick, N.J.; James R. McElroy, Jr., East Stroudsburg, Pa.

[73] Assignee: UniVirtual Corp., New Brunswick, N.J.

[21] Appl. No.: 508,370

[22] Filed: Jul. 28, 1995

[51] Int. Cl.$^6$ .................................................. G06F 17/30
[52] U.S. Cl. ........................ 707/100; 707/204; 707/104; 707/200; 707/205; 707/101; 707/103; 707/9; 711/170; 711/100; 364/570
[58] Field of Search ........................... 395/600; 364/570; 707/204, 104, 200, 205, 101, 103; 711/170, 100

[56] References Cited

U.S. PATENT DOCUMENTS

| | | | |
|---|---|---|---|
| 4,889,220 | 12/1989 | Yoshinori et al. | 194/206 |
| 4,899,299 | 2/1990 | Macphail | 364/570 |
| 5,051,891 | 9/1991 | MacPhail | 364/200 |
| 5,107,417 | 4/1992 | MacPhail | 707/9 |
| 5,107,419 | 4/1992 | Macphail | 395/600 |
| 5,123,676 | 6/1992 | Donnelly et al. | 283/37 |
| 5,182,705 | 1/1993 | Barr et al. | 364/401 |
| 5,230,073 | 7/1993 | Gausmann et al. | 707/100 |
| 5,344,132 | 9/1994 | Lebrun et al. | 271/35 |
| 5,361,202 | 11/1994 | Doue | 364/413.01 |
| 5,592,595 | 1/1997 | Wakabayashi et al. | 395/115 |
| 5,602,993 | 2/1997 | Stromberg | 395/200.1 |
| 5,611,066 | 3/1997 | Keele et al. | 395/427 |
| 5,659,746 | 8/1997 | Bankert et al. | 707/205 |

OTHER PUBLICATIONS

Cordes et al. "The use of decomposition in an object–oriented approach" IEEE, pp. 820–828, Nov. 1989.
User's Guide to the Wye Oak Information System, Retrieve Workstation, Version 1.00, Main Street Systems Inc., 1993.
Update to the Wye Oak Information System, Retrieval Workstation, Version 1.10, Main Street Systems, Inc., (undated).
System Documentation for the Wye Oak Information System, Version 1.1, Main Street Systems, Inc., 1993.

*Primary Examiner*—Thomas G. Black
*Assistant Examiner*—Jean M. Corrielus
*Attorney, Agent, or Firm*—Duane Morris & Heckscher LLP

[57] ABSTRACT

A computer based records management system comprises an information filter for assuring that record data units offered to the system for storage are complete and not redundant. These record data units may be electronic in nature, scanned from paper, digitally formed from audio, video or otherwise formed as digital data information media, an objective of the disclosed system being to eliminate paper or microform record keeping. If record data units comprising documents are incomplete or redundant, the data units may be queued for special handling, returned or otherwise disposed of. Record data units accepted for system entry are acknowledged and preferably tagged to enable tracking and forwarded for unit verification and certification. Verification and certification includes examination of units for compliance with preset criteria. Once a unit is found to meet the criteria, the unit is stored in permanent storage along with a disposal schedule determined for that unit. Only users meeting predetermined security levels may alter or dispose of a stored unit prior to scheduled disposal. Moreover, reasons for such alteration or destruction are required from the cleared user, and an associated data field must be completed. Consequently, the present system provides for record data unit tracking and audit trails in the event of any requirement for regulatory or legal compliance with discovery or other record unit requests. The present invention also permits reconstruction of the record units of an enterprise in the event of a catastrophic event.

38 Claims, 10 Drawing Sheets

COMPUTER BASED RECORDS MANAGEMENT SYSTEM METHOD

FIELD OF THE INVENTION

The present invention relates to records management. In particular, the invention concerns computer based systems and methods for, inter alia, capturing, retaining, retrieving, tracking and/or disposing of documents within a business organization.

BACKGROUND OF THE INVENTION

Business Problem—Records Management

Most organizations have a need to create and retain records which document their business transactions and related processes. Eventually, after legal, regulatory and other requirements have been met, many of these records can be destroyed. In those organizations having a formalized program of records retention and destruction, documents are most often stored as paper in filing cabinets on-site and may also be microfilmed or microfiched. The film or fiche is typically retained on-site with an archival copy stored in an off-site archival location. Paper records of completed transactions are often boxed and sent off-site to be warehoused in an archival facility.

As required in the course of business, warehoused boxes are recalled from the archival facility as access to the paper originals is required for litigation or other reasons. Management of these film and paper records is generally handled through a stand-alone manual or computer system, developed for the purpose, which tracks the location and retention period of these records. Periodically, retained records are reviewed and destroyed by the organization or archival facility. Destruction dates and frequency is determined by a combination of external requirements and organizational policy.

Management of computer-generated output from business applications has been handled in various ways, with a view toward system backup required for normal system restoration/recovery in the event of a system malfunction or as part of an organizational disaster recovery program. Records generated from computer application systems, which are considered to be part of a corporate program of records retention and destruction, are either saved as hardcopy output or on magnetic media and sent to an off-site archival facility with a retention period and destruction (or scratch) date.

Scanned images of documents stored on optical media through computer application systems are beginning to replace microfilming and/or microfiche in some organizations as an archival method, as is computer output to laser disk (COLD) technology for computer system-generated output. These systems manage the archival of documents or computer output from a retention viewpoint only. Records destruction is still handled through stand-alone systems which track volume and location information for COLD data. Paper, where not destroyed after imaging, is also tracked through a stand-alone mechanism. This duplication of records may cause confusion. In the event of litigation, for example, issues may arise as to which source of such records should be the basis for a document production. Clearing up this confusion involves expensive use of time and resources to track and report potentially relevant, duplicated records.

Currently available imaging systems allow for scanning, indexing, filing, saving and retrieving of images but do not provide an integrated ability to track file retention and initiate complete file destruction on a regular, scheduled basis. Typically, items deleted from such systems are handled on a case basis, with only database pointers (not filed images) being marked for deletion. Images are almost always written to a single medium, e.g., permanent write once read many (WORM) optical platters, from which they cannot be purged. Audit logging capabilities in such systems vary by product, from none to partial logging of system activity.

Available imaging systems do not provide for the integration of records management functions which automate the handling of records retention and destruction. They also do not consider automation of those areas required to assist with legal admissibility of stored records in courts of law. Procedures surrounding admissibility questions are, therefore, left to manual handling, which is time-consuming and subject to error and omission.

Further, the available imaging systems do not track duplicate copies of stored records which may have been retained on paper or in other form within an organization that inadvertently may not have been destroyed when other copies of the file were purged.

Business Problem—Disaster Recovery

Current system back-up and record archival processes provide, in an aggregated fashion, back-up for an organization's records in the event of a disaster. When an imaging application has been implemented, some or all of an organization's paper-based records may also be recoverable. However, because of the disparate nature of the hardware/software platforms which create back-up records, the lack of coordination between those platforms and the media on which the back-up records are archived, full recovery from a disaster could take an organization weeks or months, depending upon the types and number of records stored.

Each individual platform must be separately restored from previously saved backups and paper files without backup must be re-created, as far as possible, from externally maintained records (often from outside the organization). Synchronization of cross-platform data and records when restored then becomes (by default) a matter of how close in time each of the individual backups (being used to restore) was performed.

Obviously, any delays in the time required for a business or agency which has suffered a disaster (e.g., major destruction from a fire, earthquake or wind storm) to become fully operational again represents tremendous cost to the organization. This cost reflects the expenses of coming back on-line, coupled with the lost business opportunities experienced while the system was not operational. In addition, each back-up and recovery process undertaken in the normal course of business generates additional expense associated with the potential inefficiencies of non-synchronized back-up and the off-site storage of records.

These inefficiencies may waste time and money even for recovery efforts less far-reaching than a major disaster (e.g., where a single location goes down and multiple types of records and potentially multiple systems are involved). This is because whenever an organization's record-keeping efforts are not synchronized, reconstructing to a point in time is difficult and generally also will be costly in terms of both time and money.

Business Problem—Discoverability of Electronically-Maintained Business Records

Back-ups made for purposes of disaster recovery, which are not currently tied to any formalized program of records retention and destruction, may exist for long (even indefinite) periods of time beyond their regularly intended destruction dates. Such back-ups may be admissible evidence in the event of litigation. The proliferation of electronic mail, sent within and without an organization and saved, as well as the contents of unmanaged personal computer hard-drives can, thus, present a substantial unrecognized potential exposure to organizations. Typically, even those organizations that are meticulous about maintaining retention of paper records have not yet dealt with the complex issues of managing electronic records in the same fashion, due to the unavailability of tools to do so.

Related Art—General

Currently, a few organizations are looking to systems integrators to assist with the marriage of off-the-shelf stand-alone records management systems with archival imaging applications. These application integration efforts, if successful, may solve that portion of the overall business problem which deals with the timely disposal of archived imaged records. The records management of current computer generated data, which generally remains a process apart from normal records management methods and procedures, will not be touched by those efforts, and the synchronization of archived files to provide an enterprise-wide capability to recover swiftly after a disaster will not be addressed.

In addition, rapid changes in technology are continuing to impact organizations with new ways of communicating (e.g., inter- and intra-organizational electronic mail, systems which allow the direct generation and/or receipt of facsimile information, electronic data interchange (EDI) of data, and interactive voice response systems), all of which are records of information that should be incorporated into an organization's records management system, and be subject to destruction according to an established records retention schedule.

Because they are new, these communication methods remain largely unmanaged and are outside the scope of current records retention and destruction programs and vehicles. As electronic signatures, widespread use of EDI and inter-company systems become a general reality, the use of paper as a medium to record the business of an organization will decrease. Each organizational entity must find new methods and vehicles of archiving, reviewing and ensuring the appropriate destruction of its records in accordance with policy and externally generated requirements.

Prior Art—The Wye Oak System

An imaging archival system developed within the past few years, but not widely used, the Wye Oak system, had three main functions: Scan, Retrieve and Systems Administration.

The Scan function allowed users to scan images into the system and to place (or file) the images into predefined case, folder and document categories. The Retrieval function allowed users to access images at their workstations, annotate the images, add case journal notes and print images to a designated printer. The System Administration function allowed for the setting of user passwords, controlled access to system features and to stored information (images), and also allowed the System Administrator to turn on or off a print audit log of all items printed through the application. Other audit logging was performed for the Scan function, but not for any other functions within the Wye Oak system.

The Wye Oak system was a Microsoft Windows-based application written in Visual Basic and C language, and provided users with a graphic user interface (GUI) imaging system. The Wye Oak system also included the concept of a case journal. The case journal could be attached to a Wye Oak file by an authorized user and made either public or private, but the journal could not be deleted from the system once entered. The Wye Oak system had no built-in features for records management (file retention and destruction) and could not handle non-imaged files. The system also did not contemplate use for disaster recovery purposes or for support in litigation document production.

SUMMARY OF THE INVENTION

In view of the foregoing, it is a principal object of the present invention to provide a "cradle to grave" system and method for managing the records of an organization, whether retained as hard copy paper documents, microform or in electronic data formats, and whether text, recorded voice or other signals.

It is a further object of the present invention to provide an integration of imaging, electronic document management and records management principles.

It is another object of the present invention to provide for specified record types filtering and verification/certification mechanisms which will allow for deletion of transient, non-archival type information prior to saving required records.

It is yet another object of the invention to provide, for records stored and archived under the system, mechanisms to alter retention information, to purge records on an individual or global basis at predefined intervals, and to generate audit records of all system activity, whether system-generated or resulting from manual intervention, so as to support legal admissibility of stored records.

Still another object of the invention is to provide a mechanism for cross-referencing related records across multiple record formats, types and media, and across different hardware/software platforms, for purposes of record retrieval, tracking, retention and destruction.

Yet another object of the invention is to provide an organization with a central audit point for all electronic business conducted within the enterprise, thus ensuring that all records are captured and appropriately processed, and that external communications (such as acknowledgments) are also processed as necessary.

A further object of the invention is to provide a system that, in the event of a disaster, will allow an organization to restore its records without the delays caused by uncoordinated efforts at back-up between various hardware and software processing platforms.

These and other objects are achieved with the present invention. In one aspect, the invention is embodied in a computer based records management system and method according to the present invention. The computer based records management system according to the present invention comprises input devices for receiving record data units that may or may not be retained in the system and storing the record data units for possible retention. These record units may comprise scanned documents including or excluding marginalia, old microfilm records, information containing audio and video media, various computer generated media such as floppy discs, hard drive stored data and the like or practically any and all media and data forms that may come to mind that a user may wish to store.

One especially important element of the present invention is a unit verification and certification process whereby a record data unit is carefully examined for retention in the system in accordance with preset criteria. Once the unit is found to meet the preset criteria, the unit is stored in storage media along with record unit disposal schedules determined for that unit. Of course, as the disposal schedule requires, record units are automatically destroyed in accordance with the present invention. Practically all paper record keeping may be eliminated from an enterprise. Moreover, all paper or other records reduced to digital form are destroyed automatically in accordance with predetermined disposal schedules. Also, via unit tracking, even paper records stored off-site are identified and any record thereof not immediately purged from the system until the disposal is verified by a records manager.

Another especially important element of the present invention is an information filtering process which occurs prior to verification/certification. During information filtering, incomplete or redundant units are identified and such units, for example, may be acknowledged or forwarded for special handling or the like. Information filtering may serve to route input record data units to designated destinations. Preferably, data units passed on for verification/certification are tagged to enable tracking of units through the system, for example, for subsequent auditing.

According to a method for managing records in a computer based system, the method comprises the aforementioned steps of receiving record units for possible retention, filtering the units according to preset criteria, and forwarding the units for verification/certification or other operations, wherein said forwarded units are tagged for enabling tracking of units through the system. Once the units are verified and certified for retention, the units may be retrieved for use by anyone having access to the system, but, according to predetermined security levels, only those users meeting those security levels may manipulate or destroy the retained data units.

These and other objects, features and advantages of the present invention will be readily apparent and fully understood from the following detailed description of the preferred embodiments.

DETAILED DESCRIPTION OF THE DRAWINGS

DETAILED DESCRIPTION OF THE PREFERRED EMBODIMENTS

Figure 1A:
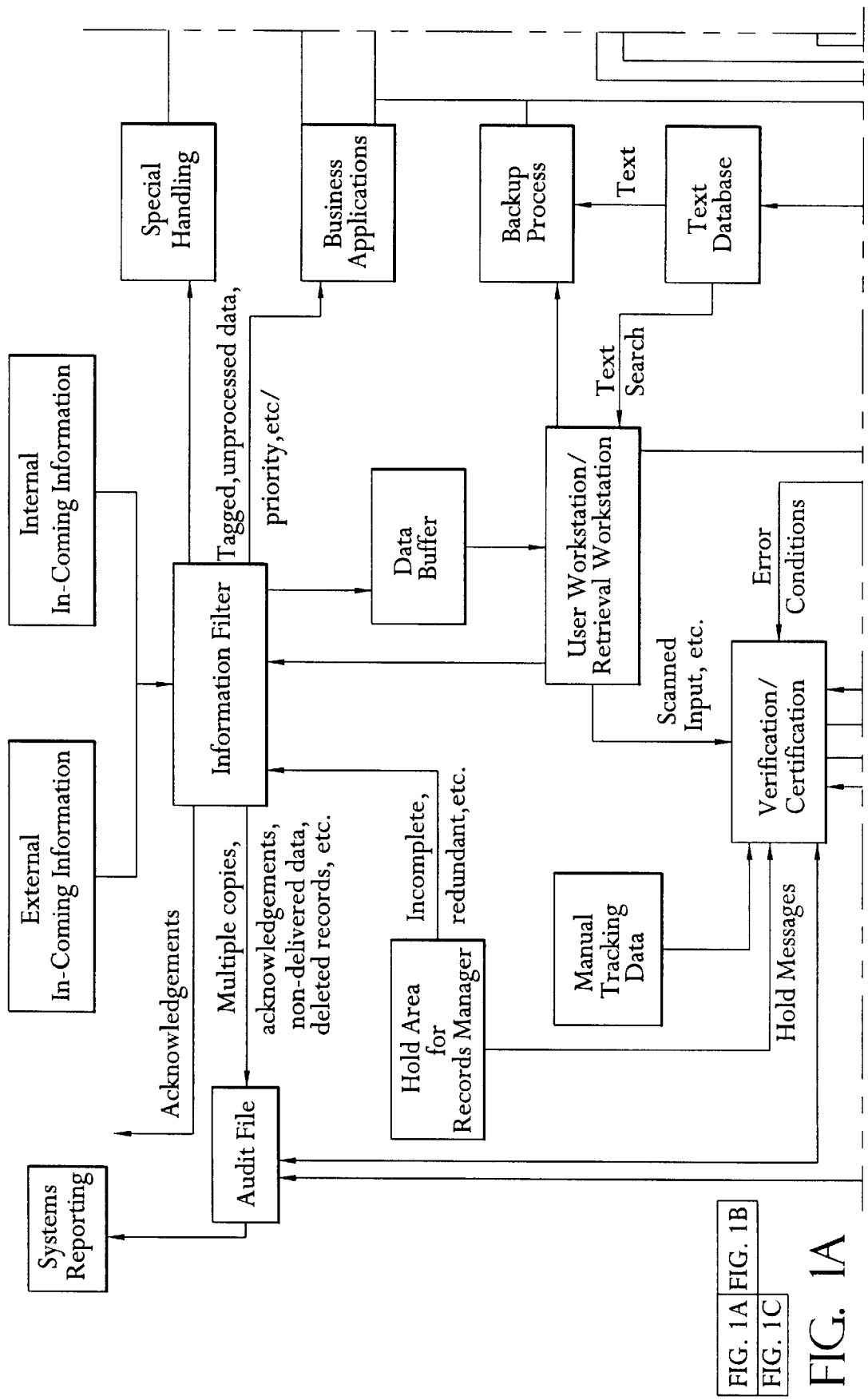
FIG. 1 is a logical schematic overview of a preferred implementation of the present computer-based system, including its various data sources, functions and stages.
Figure 1B:
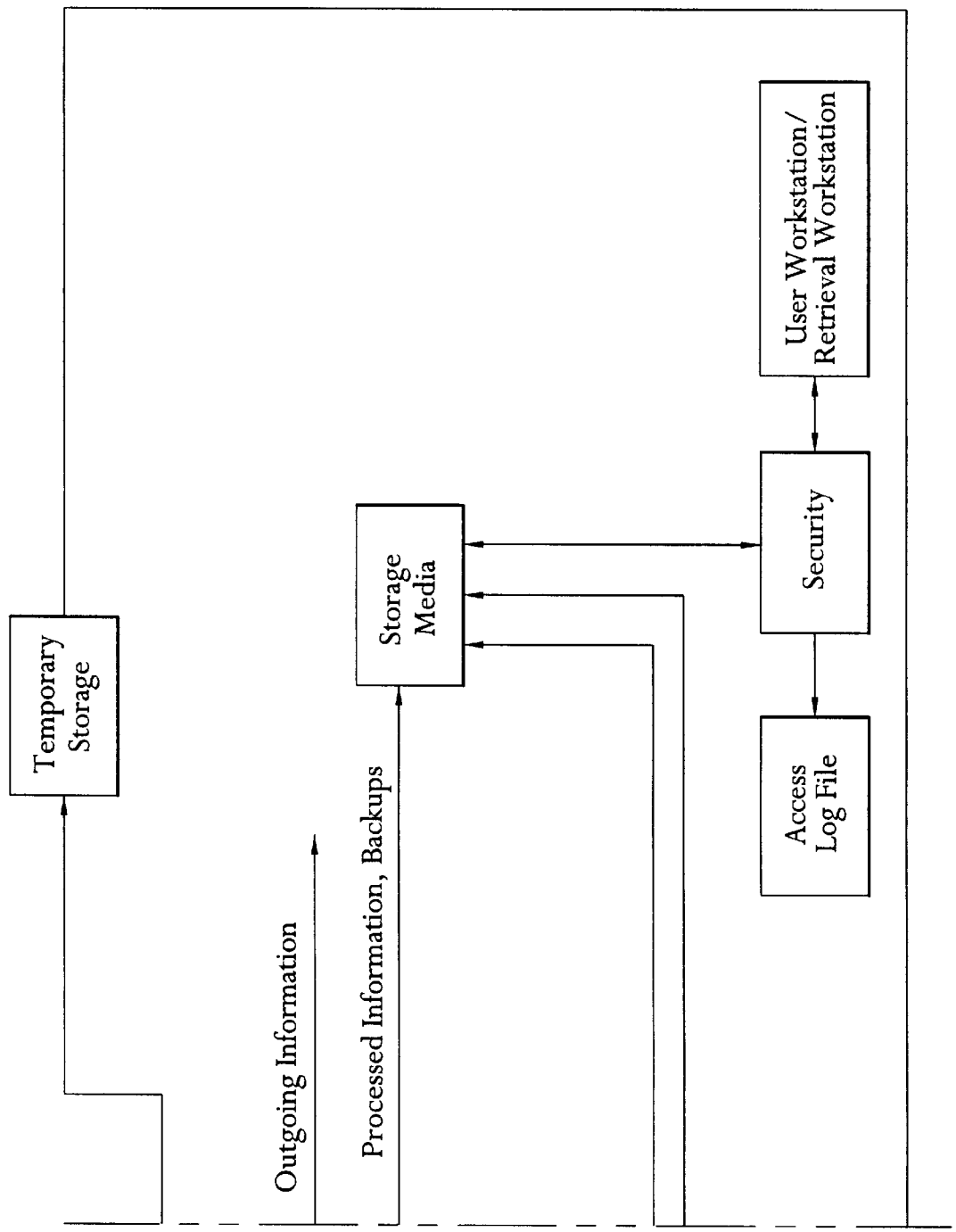
Figure 1C:
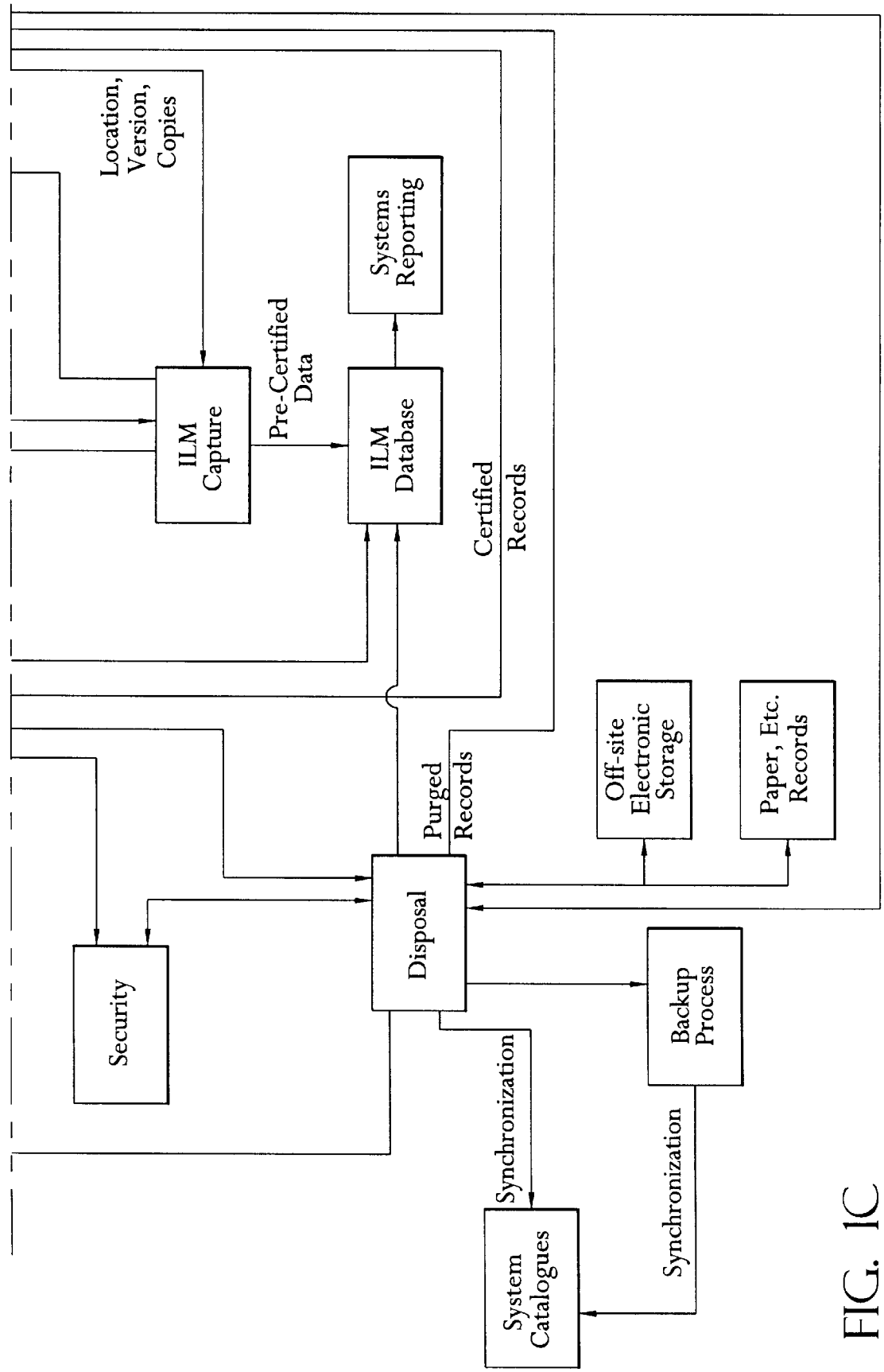

The present invention, as depicted in FIG. 1, provides an information location management (ILM) system and process by which an organization may control the receipt, acknowledgment, validation, organization, destination, storage, retention and destruction of multi-format machine readable (both on-line and off-line) and hard-copy records used by the organization in conducting, documenting and reporting its activities for internal and/or external purposes.

In accordance with the present invention, unorganized (raw) data enters the process only after it has been assembled by automated or manual means into usable information with a definable and automatically recognizable format. Temporary (transient) information enters the process only for the purpose of assuring that such information is located on appropriate media, that unnecessary backups are not taken and that all copies of such information are destroyed in a timely fashion. Version management is used to control/reduce multiple iterations of electronic data which may be resident within an organization, across applicable hardware and software platforms and physical and geographic locations, both for primary use and copies maintained for backup purposes. Copies of electronic information which are maintained (e.g. backup copies maintained on-site or off-site for disaster recovery purposes) within an organization, either stand-alone or embedded within other information, are tracked by format and location to ensure simultaneous and timely destruction of all copies maintained by the organization at the end of the scheduled retention period(s). Embedded information (e.g. images, spreadsheets embedded into larger documents) assumes the life span of any file into which it has been embedded. If the retention period for embedded information is longer than that of a larger file, prior to being embedded in that file, the retention schedule for either the file or the embedded information is modified.

Except as necessary for recovery or other such purpose, multi-resident data (i.e. data maintained in multiple versions or locations) is normalized to the most recent (i.e. valid) version, maintained in a single location and made accessible to all applications which require it. Version and location normalization occurs across databases for processed information and accounts for the distribution of localized databases in multiple sites. This ensures the simultaneous update and eventual simultaneous destruction of all file versions.

The present system and process may be implemented within a single or multi-organizational unit or may include trading partners of the organization where two-way electronic communication is the preferred form of business transaction handling. In the latter case, all partners should agree to abide by similar information management principles and adhere to specified standards for data formatting, processing and communication.

Non-electronic records, e.g., hard-copy documents and off-line data storage media, are managed by electronically tracking the printing and distribution information associated with those records, and coordinating the external control procedures and information with a centralized ILM database.

The purpose of ILM is not strictly to provide a "Big Brother" audit oversight of organizational information, but rather to provide numerous other beneficial functions, one of which is to help ensure that the smallest subset of validated records is maintained by the organization at any one time. Maintaining a deliberately minimized database of documents and (related or unrelated) coded information benefits the organization by helping to minimize for organization members the "noise" of information overload and confusion caused by multiple, perhaps dissimilar, versions of files. In accordance with the invention, necessary replicated versions of databases for distributed architectures, and generations of files retained for backup or similar purposes, are clearly defined with version and time stamp information, and all replicated versions are synchronized across the enterprise.

A minimized database also helps to maintain system performance over the entire enterprise infrastructure by minimizing the size of the index database which must be searched in response to queries or requests for information. It also reduces the amount of information which must be sent over the network in response to such requests, thereby speeding access to information throughout the enterprise.

ILM facilitates direct inter-organizational information access by tracking the location of required information and securing that information against unauthorized access. The system also tracks the intended destination of outbound information (e.g., facsimiles, electronic mail, EDI data streams) for audit and troubleshooting purposes.

In addition, ILM minimizes the ongoing potential liability associated with retaining information beyond established retention schedules by providing an automated method for ensuring compliance with those retention schedules across the organization.

ILM provides a centralized audit point for troubleshooting when system failures or other problems require back-tracking to determine a chain of events. Also, where appropriate backups are taken, ILM can facilitate recovery after a disaster by providing a single enterprise view of the status and location of all stored information at a point in time immediately before the disaster.

Preferred features of a ILM-compliant system include: (1) open (non-proprietary) architectural hardware, software, network and communications components which comply with industry standards for communications protocols and data formatting; (2) a mechanism to maintain control over system resources (e.g. system catalogues) on multiple platforms and in multiple geographic locations; (3) normalization and tracking of stored documents, formatted data and messaging across databases (this requires the creation and/or recognition of a unique identifying tag, e.g., containing document/file name, creation source and date, file location, priority and certification data, for each record processed by the system); (4) the ability to recognize the destination and source of information, to route in-coming information and to respond in real-time to electronic information entering the enterprise from external entities; (5) adherence to scheduled retention parameters for all stored information across platform databases; (6) security against unauthorized access to and/or modification of stored information, including such security vehicles as encryption of access and stored information; (7) recognition of and control over electronically maintained versions and iterations of files and documents within the enterprise infrastructure; and (8) creation and maintenance of a centralized audit point for all information created, stored and/or sent outside of the enterprise.

Referring now to the drawings, FIG. 1 is a logical schematic overview of the present system including various data sources, functions and steps. As shown in the Figure, information in electronic or other record formats may enter the system, from multiple sources, including external sources 1 or internal sources 2.

The external in-coming information comprises information which enters the enterprise from outside sources (e.g., external trading partners, clients, other third parties, etc.). This information may take many forms, including: (1) formatted electronic information intended for entry into computerized processing systems, such as EDI data streams, etc.; (2) formatted electronic information intended for direct receipt by individuals within the enterprise, such as direct digital input of computer aided tomography (CAT scans), magnetic resonance imaging (MRIs), etc; (3) unformatted electronic information intended for direct receipt by individuals within the enterprise, such as electronic mail and facsimile documents, text files, etc.; and (4) hard copy (non-electronic) information intended for direct receipt by individuals within the enterprise, which must be scanned (digitized) prior to entry into the system, such as paper-based correspondence, photographs, blueprints.

The internal in-coming information enters the system from within the enterprise (e.g., internally generated documents, spreadsheets, text files, output from computer processing systems, etc.). This information may also take many forms, including: (1) formatted electronic information created by computer application systems and intended for further processing and/or backup for recovery purposes or intended to be sent outside the enterprise (e.g. EDI data streams intended for trading partners, customers or other third parties); (2) formatted electronic information created by individuals or systems within the enterprise and intended to be sent outside of the enterprise, such as direct digital input of computer aided tomography (CAT scans), magnetic resonance imaging (MRIs), etc; (3) unformatted electronic information created by individuals within the organization and intended for either direct receipt by individuals within the enterprise or by individuals outside of the enterprise, such as electronic mail and facsimile documents, text files, etc.; and (4) hard copy (non-electronic) information intended for direct receipt by other individuals within the enterprise or by individuals outside the enterprise, which must be scanned (digitized) prior to entry into the system, such as paper-based correspondence, photographs, blueprints, microfilm or microfiche to be converted to digital form, etc.

Units of information which enter the system from external sources 1 or internal sources 2 are termed "record data units". Record data units are defined as discrete, physical units of data, whether in single or continuous form, which are characterized by one or more of: an identifiable beginning and ending; a common creation date and time; a common source and destination; a single type and format; and a common use or purpose.

Figure 2:
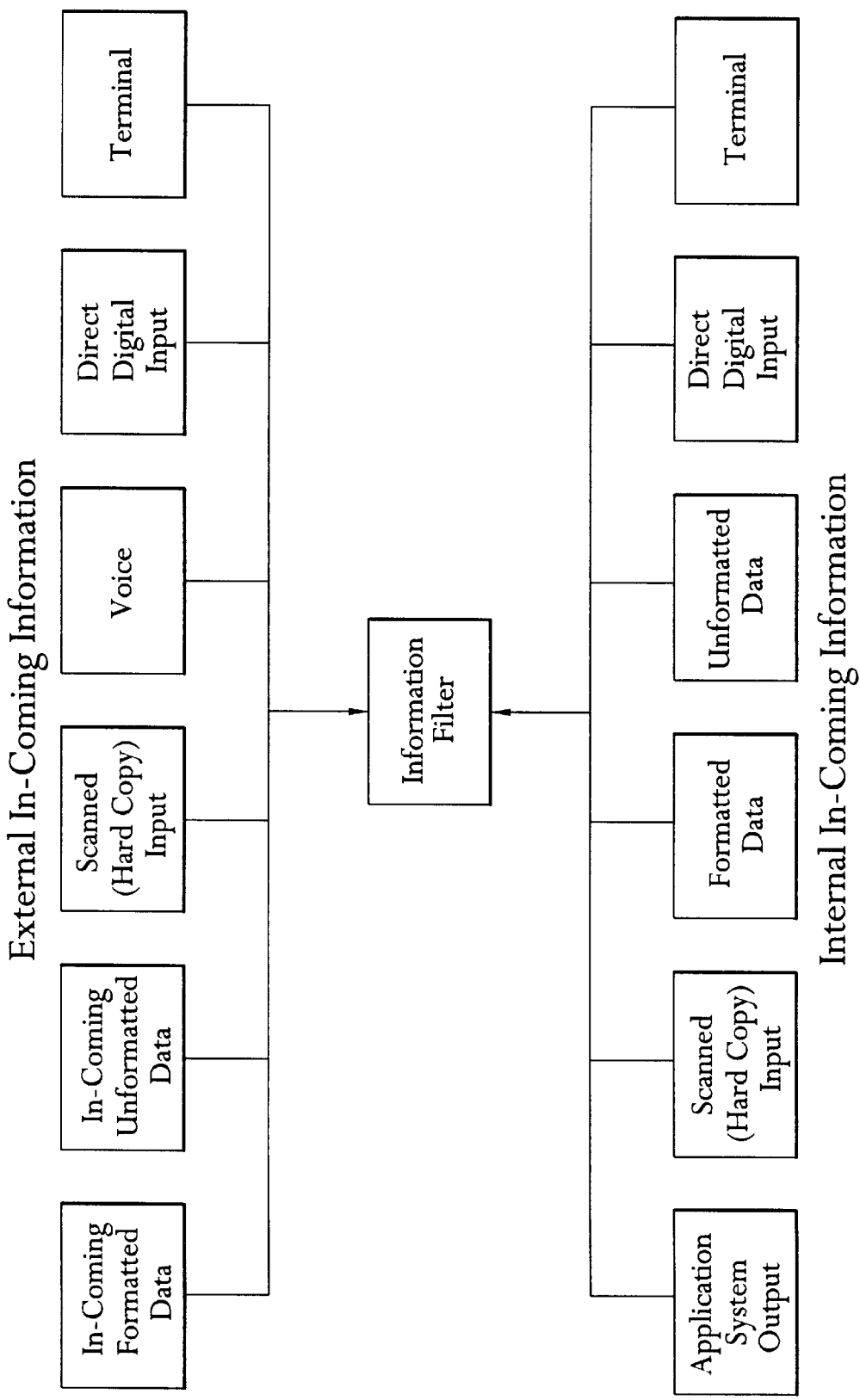
FIG. 2 is a schematic view showing in greater detail various possible data input sources.

FIG. 2 shows in more detail the various possible data input sources. As shown in FIG. 2, external in-coming data record units include (1) in-coming formatted data 1A, e.g., EDI data streams, spreadsheet files; (2) in-coming unformatted data 1B, e.g., electronic mail messages, facsimiles; (3) scanned (digitized hard copy) input 1C, e.g., scanned paper records, microfilm or fiche which has been digitized, photographs; (4) voice information 1D, e.g., interactive voice/keypad ordering input, which is converted to digital form; (5) direct digital input 1E, e.g., digital camera input, video or information such as video which has been converted to digital form; and (6) textual information 1F, e.g., word processing files or text files intended for use in text search applications.

FIG. 2 shows internal incoming information in the form of (1) applications systems output 2A, e.g., record data unit files produced by personal computer, minicomputer or mainframe business applications; (2) scanned (digitized hard copy) input 2B, e.g., scanned paper records, microfilm or fiche which has been digitized, photographs; (3) formatted data record units 2C, e.g., CAT scans, MRIs, etc.; (4) unformatted data record units 2D, e.g., facsimile, electronic mail messages; (5) direct digital input 2E, e.g., digital camera input, video, which is converted to digital form; and (6) textual information 2F, e.g., word processing files, text files intended for use in text search applications.

Figure 8:
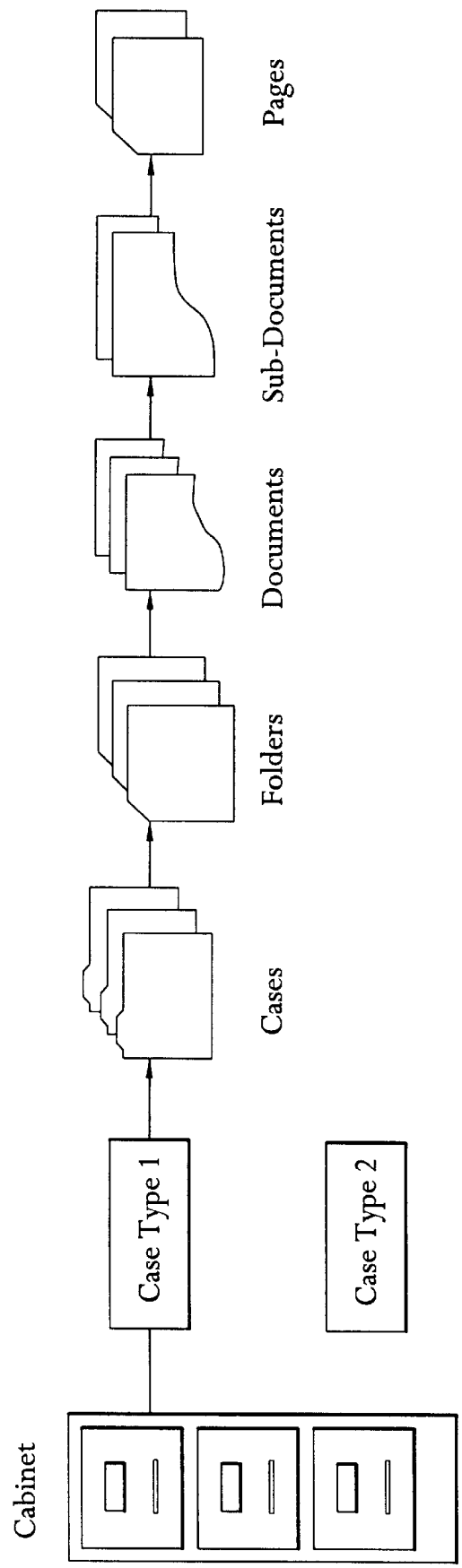
FIG. 8 illustrates a record filing (indexing) hierarchy in accordance with the present invention.

Referring again to FIG. 1, record data units which enter the system from external sources 1 or internal sources 2 are either captured directly by the system or may be received by the system after first being created and organized by an individual or automated process. In those instances, such records may then be organized by those processes into the logical file formats in which they will ultimately be archived and retrieved. (A preferred record filing structure is shown in FIG. 8 and described below.)

If incoming records (e.g., direct digital input) are to be retained by the system, these records are organized for archival by the system upon receipt within the enterprise. In most cases, retention periods and conditions (e.g. upon receipt, after completion etc.) will be controlled by the organization's established schedule of records retention and destruction, maintained within the system database.

Information Filter:

Still referring to FIG. 1, the system preferably initially processes records presented for possible retention through an information filter 3. This information filter acts as a "black box" between the creation and receipt of record data units within the enterprise and all further processing, backup, receipt and logging of this information. The filter, thus, handles the preliminary validation, routing, acknowledgement, priority verification, buffering and similar functions and provides any necessary translation, parameter passing, etc., by means of internally maintained tables. For multi-national organizations or those who engage in international communication or commerce, the filter may, in certain implementations, recognize the language used on in-bound communications and incorporate either translation or tagging information as required by the down-stream applications or recipients.

The purpose of the filter is to ensure that record data units received, either from external sources or internally created, are appropriate for further processing or handling within the organization, including verification/certification for archival. The specific functions performed by the filter at any given time will generally depend on the particular format, type and destination of the record data units being handled. However, certain functions are performed on all incoming information regardless of format, type and destination.

Information format means the verifiable structure of the in-coming information, such as a formatted EDI data stream. Information type is determined by the source (technology) of the in-coming record data units, such as voice, video, pre-processed data, etc. Information destination means the computer platform and application or other direct intended recipient of the information.

In the preferred embodiment, filter 3 captures incoming external information, as well as record data units of information created within the enterprise, and parses the information for further processing. The filter, thus, determines whether required header or index data exists (e.g. location, date/time data, etc.) and also whether appropriate filing and index criteria has been created. Where necessary filing (indexing) data does not exist, the record or file is transmitted to a hold area 4 and held for input of the indexing information by the Records Manager or other designated individual in connection with the verification/certification process described below.

Filter 3 also checks incoming information for redundancy with currently archived records (e.g., whether a record with the same index criteria and date/time stamp data has already been archived) and determines whether potentially redundant information is identified as replacement data intended to overlay the existing file. Redundancy (and potential for information resent from the source) is detected by accessing the central ILM database 13 and system audit file 9. Where redundancy is detected, the record (e.g., file) is deleted from the processing stream and sent to hold area 4. The deletion and the potential redundancy is then reported to the Records Manager or other central facility for resolution and for audit purposes.

Filter 3 further verifies whether information has previously been processed by the enterprise applications or is still to be processed or received by the destination address. Where the information has yet to be processed or received, the filter first verifies the information integrity and then returns any necessary acknowledgments to the source, logs the receipt of the information and routes the information to the proper destination, e.g., business applications 5 or user work station 7. The filter also reviews the priority assigned to the incoming records (from an internally maintained table or by reading a priority indicator received with the incoming data) to ensure timely processing of priority information. Priority records which require processing are forwarded with the appropriate priority processing indicator or flag.

In the preferred implementation, the filter determines which coded information is maintained for validation, processing, retention, retrieval, information collection and dissemination and ultimate disposal for a single or multiple organization unit. The filter attaches to incoming records a tag (i.e., envelope, pointer or reference entry prior to application processing) which can be associated with a database in order to track the source, destination, version, storage location(s) and retention data associated with the record. Where information does not enter the filter, e.g., scanned input, appropriate tag (or tracking) information is added during the verification/certification process. For internally-created information, created either at the individual workstation or by business applications, information considered to be important for saving may be sent to the filter for tagging, prior to being released either internally for further handling, or externally to trading partners, etc. Where no further handling other than verification/certification is required, such information may be routed directly to the verification/certification module for operator handling. In either case, incomplete information is trapped and sent to hold area 4 and held for input of the necessary processing information by the Records Manager or other designated individual.

As described above, the specific functions of the filter depend, at least in part, on the format of the particular information being handled. Thus, in the case of formatted electronic information, the filtering process will further determine whether the record is in a recognizable format that may be opened, read and closed by applications requiring access to the record, and whether the information is complete (e.g. has an appropriate end-of-file marker or valid close parameter). The filter also will determine whether acknowledgment of receipt, including electronic signature validation, is required by the sending entity (and ensure that appropriate acknowledgment is sent), and whether the destination of the record is clear and in accordance with organizational parameters (e.g., whether the record must be processed further before storage).

In addition, using in-coming header data and/or internally maintained tables, the filter will determine whether there is a need for special handling of the information (e.g., translation) prior to routing the information to the defined destination. Where special handling is required, the filter tags or routes the information to Special Handling module 22. For formatted information intended for direct receipt by individual(s), the filter determines the number of recipients and the appropriate destinations (e.g. workstation(s), network storage), based upon the requirements (e.g. size, type) of the in-coming information.

In the case of unformatted electronic information, the filter verifies destination and priority information and, in the case of information intended for direct receipt by individual (s), determines the number of recipients and the appropriate destination (e.g. workstation(s), network storage), based upon the requirements (e.g. size, type) of the incoming information. Also, using data on incoming record data units and/or internally maintained tables, the filter verifies the need for special handling of the information (e.g., optical character recognition processing) prior to routing to the defined destination, and where special handling is required, tags or routes the information to Special Handling module 22.

For digitized hard-copy information, the filter verifies that the destination (e.g., file structure and file index information) information is clear.

Aside from format-driven functions, the filter performs certain functions for all incoming information, regardless of format or type. For example, the filter generates necessary information tags for all units of information processed through the filter. These tags contain the following information —information unit identifier, information source, destination, version or date, and, where applicable, retention and storage location data.

The filter also attaches priority and other pertinent information to the information units (e.g., "do not save" flag for items not to be backed up) and places incomplete, redundant (not identified as appropriately re-sent) or otherwise apparently inaccurate information on "Hold" in hold area 4. This information is reported to the Records Manager message queue or other appropriate location for further action (see arrow 5A).

The filter further sends tagged, complete information to the destination recipient i.e., user workstation 7 or business applications 5, for further processing, and receives information returned from Special Handling module 22 and routes that information to the destination recipient or application. The original file sent for special handling is maintained at Special Handling module 22 in temporary storage with a limited retention period, e.g., 90 days, until processing of the information is complete. Where information intended for direct receipt cannot be delivered, the filter sends acknowledgement and, as appropriate, stores the incoming information in data buffer 6 for later delivery. The filter further logs, to audit file 9, all appropriate information (multiple recipients, acknowledgements, non-delivery, items held, special handling,etc.) The audit file can be used by the Records Manager or other authorized persons to provide system reporting on audit-related matters.

Information Processing

Electronic information which leaves information filter 3 after being parsed (or information which has received special handling and is now being routed to its destination) is routed to business applications 5, user workstations 7 or the Records Manager hold area 4.

Items of information intended for individual receipt, such as facsimiles, electronic mail messages, electronic forms and files, etc. are routed to the identified user workstations. Where storage requirements prohibit routing to the workstation, the data is stored on the network (described hereinafter with respect to FIG. 7) and a workstation notification message with appropriate access information is sent to the recipient, who will then access the stored information on the network.

Data streams intended for processing by computer applications are routed to a hold queue and a message is sent to the console controlling that application.

Record items which are intended for real-time receipt (e.g. video and/or audio transmissions) are routed immediately to the receiving address. If this routing cannot be completed, a message is returned to the sender and the routing attempt is logged for audit purposes. Where possible, the incoming record is buffered in data buffer 6 for delayed routing as resources become available.

Record data which is intended to overlay another version of that data at the same storage location is updated after an audit record of "before" and "after" data is sent to the central ILM database 13.

Scanned (digitized hard copy) information which leaves the user workstation is sent directly to verification/ certification module 10, for processing by an operator, i.e., the Records Manager or other designated person with authority over the retention of records within the organization. The verification/certification module receives information from multiple sources, and is described below.

Record data units of information received at the destination are processed by business applications 5 or otherwise handled at user workstations 7. Where the processed information is to remain internal to the enterprise, appropriate backups will be taken by backup module 8 subsequent to processing for recovery purposes.

Appropriate backups will also be taken by backup module 8 of information at the workstation (or information saved on network drives), including a special backup of identified text files which may later be utilized for text search applications of text database 12.

In the present system, information is processed by an organization's systems and personnel outside of the actual ILM system itself. The ILM system will, however, continue to interface with those systems and workstations to track tagged information through its many stages within the organization, from receipt and initial parsing through processing, backup and eventual disposal. This tracking is made possible by the information tagging done by the filter, which uniquely identifies every unit of information which is considered important for the enterprise to retain (i.e., not every piece of information created within the organization will be tracked for retention). Information which will generally be considered important for retention includes (1) information which is part of an organization's official records retention schedule; (2) information required to be backed up as part of a potential recovery process in the event of a disaster or computer failure, including external incoming information intended for input into business applications which will result in that backup process; (3) incoming information, preidentified to the filter by source, type and format, which is intended for input into business applications or to be routed directly to recipient(s); and (4) information created within the organization which is routed to the filter for tagging by an individual or process prior to any subsequent handling based upon a determination that such information is important to a business transaction or other affairs of the enterprise.

Information not considered to be important for retention may either enter the filter (e.g., external incoming electronic mail messages which are not to be saved by the organization and which would receive a "do not save" flag from the filter or deleted, redundant data) or may not enter the filter (e.g., created and saved on the user's workstation hard drive and not considered necessary to be saved by the workstation user). Such decisions are made both at the filter level and by individual system users, including the Records Manager.

ILM Capture and Update

Previously processed or otherwise handled (e.g., viewed at user workstation) information which is to be archived within the organization is captured, in the preferred implementation, prior to being processed for verification and certification. This capture is performed to ensure that the current location and version information, subsequent to processing and system backups, is captured for all information processed via business applications across multiple platforms, including such information for all replicated databases. It also ensures that the information sent to user workstations (and any subsequent backups taken), which is to be subsequently archived, is complete and organized for subsequent filing by the verification and certification function; that all necessary preprocessing of text files to be archived is done to ensure appropriate handling by subsequent text searches; and that information which should not be backed up (e.g., flagged as "do Not Save") has not been backed up after processing or viewing. For all captured information, a preliminary update of location and version data to the central ILM database is done prior to processing by the verification/certification function.

To explain further, location and version information concerning uncertified or pre-certified records is captured by ILM capture module 11 for update to ILM database 13 prior to any processed information entering verification/certification module 10. This update is done for recovery purposes, in the event of system failure during processing. Location and version information is captured for all outbound information, i.e., information created for sending to destinations outside of the enterprise, by either business applications 5 or user workstations 7; for all processed information intended to remain internal to the enterprise; and for all text files identified for later use by text search applications.

Outbound information or record data units may consist of processed data files, such as EDI data streams produced by business applications 5. It may also consist of information produced at a specific user workstation 7 (e.g., text files, images faxed, etc.), which is considered by the organization or user to be important to the business of the enterprise and therefore, important to be tracked. At the user workstation level, the decision to track outbound information is made by the individual user.

Most processed information files are created, backed up and sent to the appropriate external destination or regular internal storage location. For these files, version and location information is captured for the purpose of managing retention and eventual disposal only.

Information coming directly from the user workstation (including scanned documents) will not normally enter the ILM capture module but will do so if the information requires further internal processing (other than verification/certification) and has been sent to the filter for tagging and routing or the information is being sent outside of the enterprise and is considered important be to be tracked by the workstation user. Such information will also enter the ILM capture module if the information is textual in nature and will be utilized further by the organization for text retrieval applications.

The purpose of capture is to ensure that the location of all information intended for retention by the organization is maintained. This is done to create a complete and normalized database of information critical to the enterprise; the state of the information within the enterprise is maintained at all times in the event that audit or recovery from failure or disaster is required.

Figure 4:
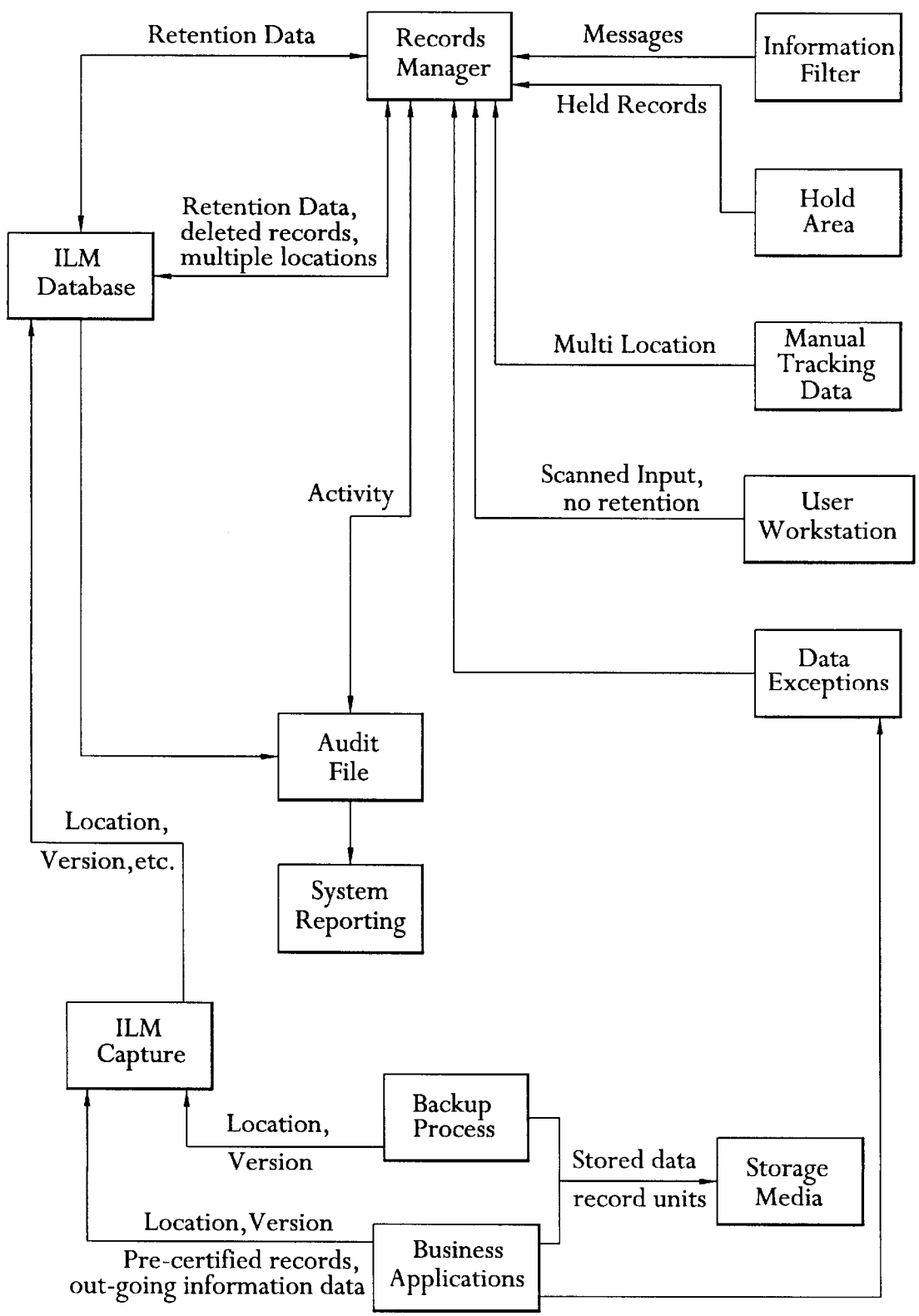
FIG. 4 is a logical schematic view illustrating in greater detail the verification/certification function shown in FIG. 1.

Verification/Certification (FIGS. 1 and 4)

Records (image or non-image) are not accepted for archival within the present system or viewing through the Retrieval function unless the documents are first "certified." Certification ensures that documents and files are placed within the correct filing structure and associated with the proper documentation. It also ensures that the documents or files have been properly captured (through scanning or import) and have the appropriate retention information attached.

Sub-document pages (image or non-image) may be viewed and certified, deleted or placed on hold status if questions arise which must be answered prior to certification. Certification involves viewing the images or electronic records attached to the sub-document for clarity and correctness and proper filing within a case. Default retention information may be changed during this process and the reason for such change entered for audit logging.

The act of certification moves the sub-document within the system from the temporary network storage location to a permanent filing location (cabinet), which may reside on disk or on permanent or erasable optical media. Certification provides the quality control assurance often needed in legal proceedings to address the admissibility question concerning the knowledge and skill of the individual(s) who created the record in the normal course of business. Certification replaces, in the on-line records management world, the act of verifying microfilmed images in the micrographics arena.

For processed information, a system verification/certification module 10 determines the appropriate security level and vehicle for retrieval of the archived information and provides additional edits to verify the accuracy of header/index information (e.g. that a normal end of file on EDI data stream exists). For textual information where text search and retrieval may be needed, the location and header information of the text file will be saved for referencing when text searches are performed.

The verification/certification process is performed in either of two ways, i.e., by an operator viewing the records to be certified or automatically without operator intervention. In cases of operator intervention, the operator may query audit file 9 for information concerning the status of information under review.

Operator intervention, which requires access to security module 20 for verification of operator authority, is required in circumstances where resolution is required for incomplete, redundant or other potentially inaccurate information which has been placed in hold area 4 by information filter 3. Operator intervention is also required where digitized (e.g., scanned) hard copy documentation is reviewed for completeness of indexing information, filing placement and appropriate retention information, including storage media.

In addition, operator intervention is required where error conditions are detected during the filter, audit, special handling, data buffering, ILM capture or database update operations which require manual intervention. Errors occurring outside system boundaries (e.g., within business applications, user workstations or backup processes) should be monitored and corrected within those processes, but may be detected by the ILM capture module.

Operator intervention is further required where information enters the system, either through information filter 3 or from a user workstation 7, for which no pre-defined retention information is available; and where manual tracking information 23 for manually held records must be manually keyed into the system for later use by the disposal module 14.

Operator intervention is not required for processed application data files, which are automatically certified and sent directly to permanent storage media 19, where the media and retention parameters are pre-defined within the system. Storage media 19 may be directly controlled by multiple hardware/software platforms. In cases of automatic verification/certification processing, the system will access the audit file 9 during the verification process.

Also, where large, processed computer files are received by the system for COLD (Computer Output to Laser Disk) storage (e.g., computer report runs), the verification/certification process will receive these runs and route them to final storage location(s) as pre-certified records. In all cases, certification information and "permanent" storage location is updated to the central ILM database 13, which is the vehicle for most system reporting functions (block 15).

When the record is certified and certification information is written, pre-certification information (written by the ILM capture process to a database file) is deleted from the system. A record of all certification activity is also written to audit file 9, and audit reporting (block 15) can be done utilizing audit file information.

For processed information not automatically handled by the verification/certification function, a Records Manager 25 (FIG. 4) performs a Quality Assurance review, as part of the verification/certification process, which checks the appropriateness of the record for archival and determines the recording media, and volume, where applicable, for storage. The goal is to provide storage of records with similar retention periods on the same volume and thereby expedite the destruction process. Certain large record types (such as direct digital input) may be specifically stored on media (such as Write Once Read Many, or WORM, platters) and volumes retained for those records.

The Records Manager has the option to commit the record or file for archival in ILM database 13, to delete the record or file from the system as inappropriate or erroneous or to place the record or file on "Hold" in hold area 4 for a specified period to resolve questions, after which the record will be deleted or committed. Committed records will enter the archival process and be stored to allow retrieval until the selected or system-calculated destruction date.

The Records Manager will utilize the method and system to ensure the retention of all record formats and appropriate destruction of all logically related records and record versions. The system will provide the Records Manager with a catalogue of records scheduled for destruction, (see FIG. 5, block 49), with file/case/folder/dataset name, logical and physical location(s), destruction date, record format and type and related information. The system will also check the scheduled record type and retention period for those records against the currently authorized retention schedule and report discrepancies which the system has not previously detected.

The Records Manager will determine whether to modify retention information or to destroy scheduled records. (see FIG. 5, block 26, 27 and 28). During the destruction process, the system will produce a destruction verification log for certification of record erasure and reindexing of volumes where not all records were erased/destroyed due to extended retention periods.

System links to all involved processing platforms will ensure that all new backups are taken and system dataset catalogues remain synchronized after destruction. (see FIGS. 1 and 5, block 16). The best, but not the only method of implementing the invention, ensures that, as required, JCL or other appropriate commands will be issued by the system to synchronize all affected system catalogues. Where microform or paper records are destroyed, the Records Manager will oversee the process and enter destruct certification into the system. (see FIGS. 1 and 5, block 18).

The system will retain the link between stored versions of unprocessed information received from external entities and processed versions of that same information so that both files or data streams, if saved, will receive the same handling for retention and destruction. The system will store the location of all on-site and off-site versions of electronic information, including backups and replicated databases.

Records managed by the present system and method may be maintained on multiple media types and in multiple physical and logical locations. (see FIG. 3, blocks 19A through 19F and FIG. 6, blocks 19C through 31). The system will track the record type, record format, location, dataset name, volume identifier, as well as specific index information, security level and retention/destruction data.

The system will allow the automated maintenance of approved records retention schedules, including the ability for the System Administrator to make global modifications to retention data to all records for record types where policy or external reasons cause a modification to retention criteria (see FIG. 4, block 13). This includes the ability to suspend and resume scheduled retention for specific information in response to legal, regulatory or other needs or requirements.

Records to be managed under this method and system result from transactions initiated and completed through various electronic vehicles generating industry standard record formats, which may include some of the following: (1) scanned input, including scanned documents, photographs, blueprints, X-rays, etc. filed and retained as images or microfilm/microfiche records converted to image format; (2) electronic mail, including incoming, internal and outgoing messages filed and retained as part of an organization's transactions; (3) facsimiles, including electronic facsimile information; (4) voice, including voice messages captured as incoming telephone traffic, voice annotation related to specific organizational transactions obtained through audio capture or speech recognition, interactive voice input (e.g. interactive telephone ordering systems) containing both voice and pulse input; (5) video, including data captured as digitized video images; (6) text, including text files relating to completed transactions and resulting from word processing files, optical character recognition output, document recognition system output, conversion from voice input captured through speech recognition, or computer business application output; (7) electronic data interchange (EDI), including EDI data streams retained as trading partner transaction records; (8) output from computer application systems, including records of completed transactions (e.g. closed claims), periodic financial reports, employee records, etc. generated from hardware/software platforms including personal computer/local (or wide) area network (conventional wire, fiber optic or wireless), mid-range computing platforms, mainframe computing platforms; and (9) direct digital input, including computer aided tomography (CAT scans), magnetic resonance imaging (MRIs), computer-generated holograms, digital packet data received through cellular transmission, etc.

The system can also be used to track the location, record type, destruction date and case-specific information for non-electronic records and manage the retention, retrieval and destruction of these records, including microfilm/ microfiche (not converted to image format) and paper records, whether stored on-site or in off-site archive facilities.

FIG. 4 illustrates the verification/certification function in detail. As shown in the figure, Records Manager 25 receives input for verification and certification from multiple sources, which includes messages coming from information filter 3, and record data units such as held records which have been placed in hold area 4 by the information filter or previously by Records Manager 25. Records Manager 25 also receives manual tracking data 23 for information not controlled directly by the system which must be entered and tracked for eventual disposal of the off-system information (from off-site electronic storage 17 and paper records 18 shown in FIG. 1). In addition, the Records Manager receives data processing exceptions 24 from business applications 5.

Records Manager 25 also utilizes information from audit file 9 and retention and related data stored on ILM database 13 during the process. System reports are created from data on both audit file 9 and ILM database 13. During this process, Records Manager 25 may enter required information about the data record units being certified or about data record units outside the direct control of the system (i.e., in storage areas 17 and 18), commit or certify the record data units, place the records on hold status in hold area 4 or delete records from the system due to error conditions.

Figure 3:
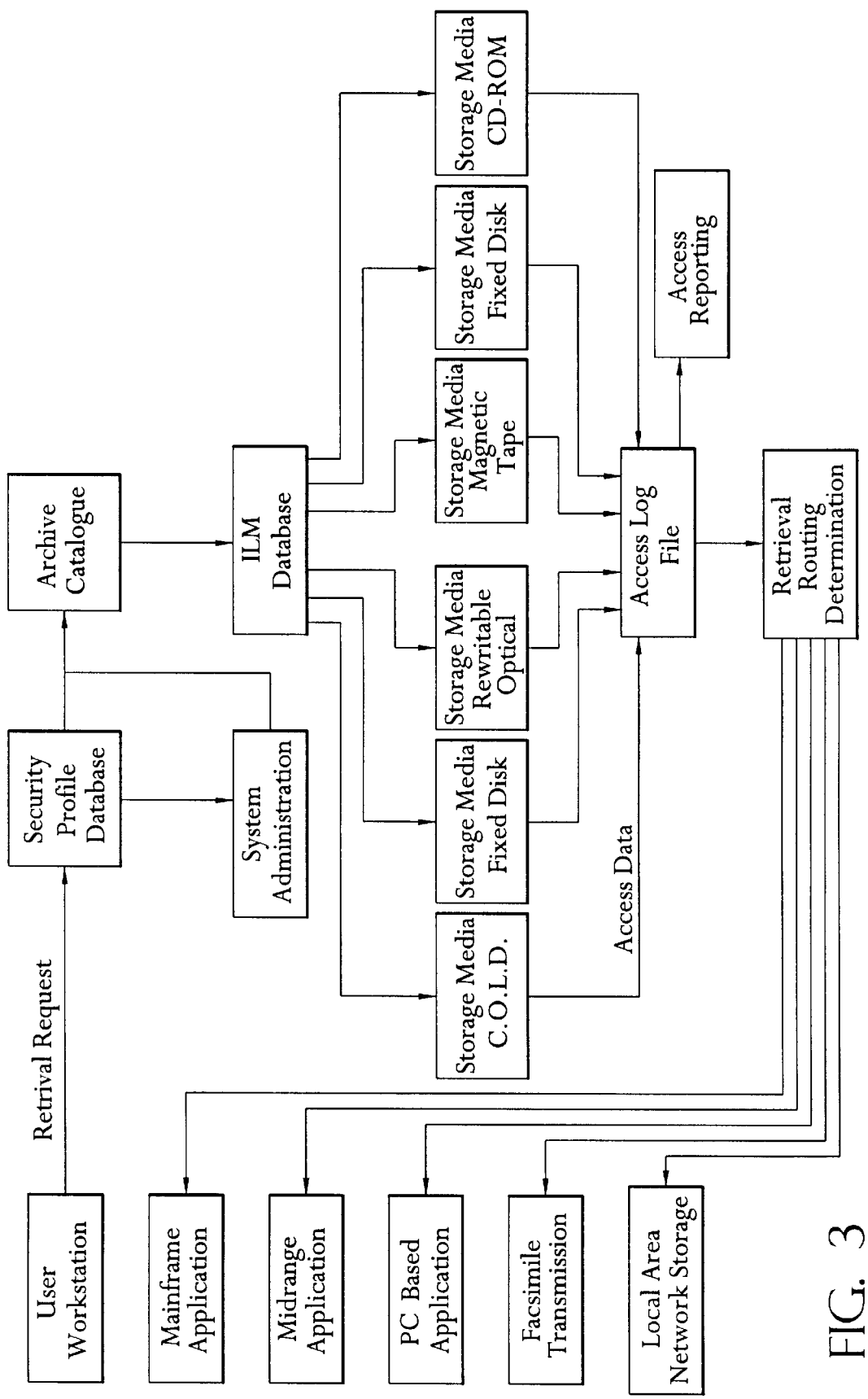
FIG. 3 is a logical schematic view illustrating in greater detail a retrieval function of the present system.

Data record units processed by business applications 5, and backups taken by backup module 8 of these files, are stored on storage media 19. Location and version information concerning these data record units is captured by ILM capture module 11 and updated to ILM database 13 during the automatic certification of the previously stored information. Where copies of the information created by the business applications 5 have been sent outside of the enterprise, this information will also be updated to the ILM database during the automatic certification process. Processed information for which no exception conditions are noted need not be handled by the Records Manager 25 during this process. System Access/Information Retrieval (FIG. 3)

Information stored within, and controlled by, the present system may be requested for retrieval, viewing or other processing by authorized users of the system. All such requests will be processed by the system to determine the level of security access authority of the requesting user, in addition to determining a viable vehicle for viewing or using the information (e.g., sending copies of the requested information to the user workstation, to network storage, to an application program, etc.).

The purpose of the retrieval function is to provide access to stored information to system users within the enterprise in a manner consistent with the requirements imposed by the type, format and size of the requested information, as well as the information access needs and procedures of the enterprise.

All individuals with access to the system will have security level access information in their individual profiles, (see FIG. 3, block 20) which will extend or limit access to, and duplication of, the various records and record types managed by the system. Where paper hard copy records and/or microfilm or microfiche are also managed through this process, the system will track the on-site location or warehouse where the records are stored, as well as the warehouse location or on-site file drawer, for ease of retrieval from any location.

The ILM database includes information concerning logically related records, their locations and retention data for retrieval and reconciliation of retention periods and other information, to ensure simultaneous destruction of all record versions.

Individuals with sufficient system access may view the archive catalogue 25 (FIG. 3) and request retrieval of archived data. The system will verify access authority to requested information prior to retrieval.

Routing of archived information will be managed by the system depending upon the record format requested. Audio, video, image, textual or facsimile information will be routed to the workstation 7 of an authorized requester and placed in a queue for local access. Large application data files, EDI data streams, etc. will be routed to the appropriate location/ CPU (see FIG. 3, blocks 5A through 5E) with header information concerning the request (requester, date, time) for processing by the business application, data file searching, etc.

All retrieval requests will be logged, and requests without necessary authority will be routed to a system user with authority for system administration for exception handling. The System Administrator 26 (FIG. 3) has the choice of approving or denying the request for information and routing the information to an appropriate receiving agency.

FIG. 3 shows the information retrieval process in more detail. In the figure, retrieval requests for record data units of information are sent from an authorized user workstation 7 of the records management system. These information requests are passed to the system security module 20 which determines the user's access rights to the information. Authorized users may request information after viewing the archive catalog 25, which is part of the central ILM database 13. Requests which pass security validation are routed to ILM database 13 for location information. The system then routes the retrieval request to the appropriate storage media 19A through 19E to obtain a copy of the requested record data unit(s). Access information is updated on the ILM database access log 41, and the system determines the appropriate routing for the information (block 24), i.e., sending the data to a user workstation 7, business application 5A through 5D or to an accessible location on network storage 5E. All information concerning access to record data units controlled by the ILM system is available from the system reporting function (block 15).

Retrieval is the most used function and allows system users to select and recall case files or selected contents using any of the defined case level and sub-document level index criteria, quick search characters (e.g., the first letter of a word) or "wild cards" (special characters used to represent character strings), with numerous defined search types (any part matching, all parts must match, etc.).

This function allows all users to obtain instant access to the same file or documents without searching for hard copy files or creating unnecessary duplicates of records. Retrieved images or electronic files are copied to the workstation for local decompression (images) and viewing, annotation (images), printing (images) or making a working copy (electronic files). Such copies are resident on the workstation fixed disk only until closed within the session or until the end of the session, when the copies are deleted from the workstation. System users in separate geographic locations may view and annotate the same file, requiring only a screen refresh to view one another's annotation information.

Retrieval also allows authorized users access to related indicators and information in the form of annotations (line drawing, highlighting, electronic "sticky notes" or margin comments), any icon "bullet" status indicators which have been attached to cases or individual images with a descriptive message and any case "journal" entries which have been created by individuals and attached to case files. These journal entries may be either public to authorized system users or private to the author and may have diary "tickler" dates attached which generate reminder messages to the author in their workstation message queue at the appropriate date. Case journals are useful for maintaining on-line diaries of case-related information. Journal entries may be edited or deleted only by the author or the Records Manager.

Persons wishing to review imaged (or other electronic) information are allowed to select a portion of a case or folder (specific documents or sub-documents) that they wish to view before images or files are retrieved for local viewing at the workstation. This lessens image traffic on the network and improves overall system performance.

In one implementation of the present invention, retrieval features are accessed through "point and click" on the ToolBox and ToolBar command utilities or by using speed keys or pull-down menus. Images or non-image files may be viewed in single-page (one page at a time) mode or in dual-page (two pages side by side) mode. Non-image files are viewed by using scroll bars to navigate through the document. Options to assist a user in scrolling through documents once retrieved to the workstation include: (1) clicking on sub-documents and pages within sub-documents from a navigational box on the Toolbox; (2) the use of speed keys such as the up and down arrow keys, pageup and pagedown keys, end key, etc.; and (3) utilizing a "case scan" function which, at a user-selectable speed, allows the scrolling through of images and files in either single or dual-page mode and a stop button to cease the scan when the desired page or file is reached. Multiple cases may be open on the workstation at any one time. Pages from multiple cases retrieved to the workstation can be viewed in a "side by side" mode for comparison of contents.

Case journals may be accessed by authorized users from within the retrieval function or from the menu. Case-level index criteria may be edited from within the retrieval function.

Options available to manipulate imaged information once retrieved to the workstation include: (1) Zoom (sizable window showing selected portion of image or user-defined variable window showing document over entire viewing screen); (2) Rotate (reposition image at 90 or 180 degree intervals; all annotations currently saved with the image are also repositioned accordingly); (3) Landscape (display image in landscape format and save landscape position for further viewing by all system users after session is completed; when images are placed in landscape, any annotations attached in portrait mode will be repositioned accordingly); (4) Annotations (overlay, edit and delete highlight or drawn line annotations; electronic "sticky notes", which are text entries that close to an icon which may be positioned anywhere on the displayed image; margin comments, which are text entries within an open window, which may be positioned anywhere on the displayed image; and "bullets", icons which attach to an image and which may have the bullet name overlaid as text on the image when displayed (e.g., "canceled")); (5) Case Scan (allows the user to page through retrieved images or electronic files at a selectable speed and stop when the desired page or file is presented for viewing); and (6) Image Tagging (allows electronic "paper clipping" of a subset of retrieved images to create a dynamic file for working at the workstation. This paper clipping, or tagging, feature allows navigation through all retrieved information or only tagged information). These features do not impact upon the integrity of stored information.

The following system utilities may be called from within the retrieval function: (1) Send a Message (which allows a user to send a message to the specific user workstation or to a general message queue for workgroup access); (2) Save a File (allows the authorized user to make a "working copy" of a saved electronic or image file and export it from the system; (3) Send Fax (allows the user to fax imaged information directly to an external facsimile modem or machine); (4) Print (allows the printing of selected cases, folders, documents or sub-documents to a defined local or network printer); (5) View Message (allows the user to review their individual message queue at any time); and (6) Search (allows a report to be generated of cases which meet one or two search criteria-either within a case type or across all case types).

Where so configured, the retrieval function is under the control of a specific user message queue when the user logs on to the system and selects the retrieval function. The system will present the message queue only if outstanding messages are present. Messages, once read, are deleted from the system to help ensure that unnecessary, transient information is not saved. Messages may have the case identifier of stored case files attached, in which case the user may click on the identifier and go directly into a case contents dialog for that case, which allows the user to select that portion(s) of the case (or the case itself) that he wants to retrieve for viewing. When a message is sent, the sender may set a priority (1 to 99) for the message, which will determine the display order of the message in the message queue (messages with the same priority level will be displayed within priority in the order received). The system will poll for user messages on a user-selected basis (e.g., every minute to an hour). When the system identifies a newly received message, a user message is sent and the user may elect whether or not to view the message immediately.

The retrieval module accesses the ILM database, which contains pointers to the physical storage location of the image(s) or electronic files to be retrieved. Image copies are retrieved from the image server and sent in compressed form over the network and then decompressed by the software portion of the imaging engine for display at the requesting workstation. Electronic (non-image) files are not compressed for storage. The images or files are optionally encrypted for enhanced security.

Disposal of Records

Certified information, maintained within the system, is held for periods of time (or other retention parameters, which may include retention by source, by destination, by data usage, etc.), based upon the approved retention schedules and other criteria (e.g., system backup schedules) of the enterprise.

For some records, retention information may be incoming with the record or retention may be assigned to the record (e.g., information created at a system user workstation) when it is sent for verification/certification.

At the end of the retention period (or version cycle, etc.), except in those cases where information is so flagged or where retention has been suspended due to legal action, regulatory proceeding, etc., the system will electronically purge the retained information from all necessary storage locations across all affected hardware and software platforms. The purpose of the disposal function is to maintain the smallest possible subset of validated information required to manage the business of the enterprise.

The present system provides an automated method of tracking the retention of stored records and a purge feature which provides for the complete disposal of records at the end of the retention period. While other systems dispose of database information and stored pointers, the present system completely purges the file and all associated records and images, even those stored in cabinets or residing on permanent (Write Once Read Many, or WORM) media.

During disposal of stored records, the system will purge records from storage media 19, directly controlled by the system, and send a purge request for electronic or paper records stored off-site (at off-site electronic storage 17 or in paper records 18) or not within the direct control of the system, including backup copies stored for recovery purposes. Such requests will cause data concerning the record data unit of information to be retained within the system until the Records Manager or authorized individual certifies that the records have been destroyed.

Also, during the disposal process, the system will log all purge activity to ILM database 13 and audit file 9; delete all active pointers and other related information from ILM database 13 and other affected databases; and where required, initiate a new backup process via backup module 8 to create files without purged records. The system also will send appropriate commands (JCL, etc.) to affected platform system catalogues 16 to synchronize dataset versions. Reports of all results of the disposal functions are obtained from the system reporting function (block 15) or from information contained in ILM database 13. Reports containing related audit information (block 15) may also be obtained from audit file 9.

Once disposal is completed, recovery of purged items which were deleted in error is only available from a saved backup of the system. All files and documents which are purged using this function are logged, providing proof that destruction was done in the "normal course of business" according to established procedures.

Disposal of images and files is facilitated by allowing authorized individual(s) to select a file type (or all types) and to build a list of all documents within the system whose disposal date is equal or prior to the current date. When the list is built, all documents (except those carrying a "Do Not Delete" flag, which prevents purging from the system until the flag is removed) are automatically selected for disposal.

The authorized user may de-select a document or file and remove it from the normal disposal process, if this is desired. When this is done, the document will not be purged during the disposal process.

The system allows an authorized user to modify retention information for items not purged in the disposal process or to retain the original disposal date. Where the retention information for those items is subsequently modified through the "recertification" process, a reason for the change must be entered into the database by the Records Manager. When the disposal date is not modified for items not purged, these items will present themselves in all subsequent disposals (for that case type) until the items are purged.

Figure 5:
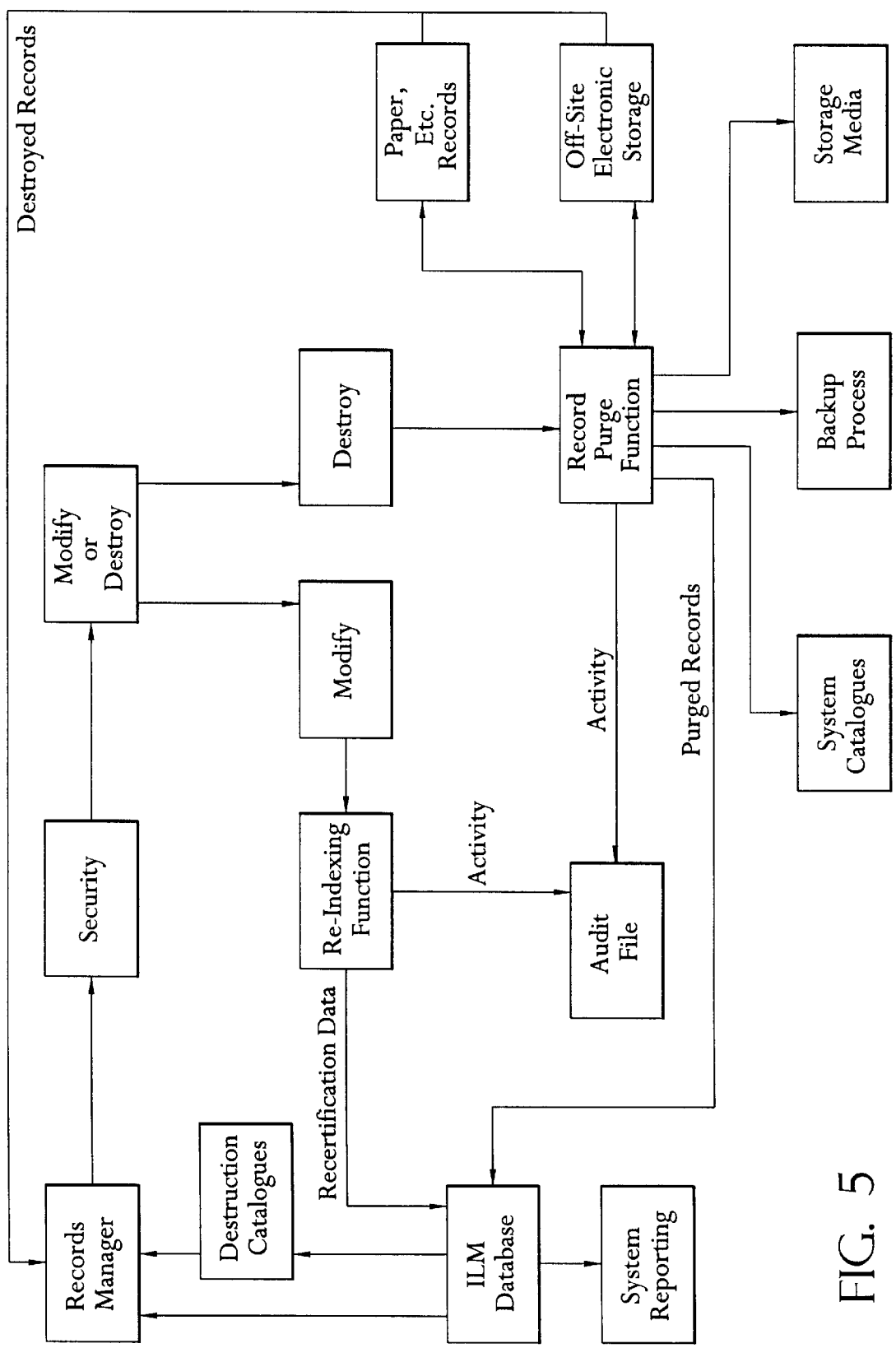
FIG. 5 is a logical schematic view illustrating in greatest detail the record disposal function shown in FIG. 1.

FIG. 5 illustrates the disposal function in detail. Referring to the figure, disposal of records is initiated by Records Manager 25 at defined intervals. Records Manager 25 may choose to destroy a set of record data units, to exempt the records from disposal and/or to modify the retention information. Where retention is modified, the record data units are fed to a reindexing function 29 where retention data is updated. The new retention data is updated to the ILM database 13 and the reindexing activity is also reflected in audit file 9.

Where the decision made is that records are to be purged (block 28), the system (block 30) purges the record data units from storage media 19 controlled by the system and removes all related data from ILM database 13. The system also records the purge activity to the ILM database and logs the activity to audit file 9.

Purge requests are initiated for records 17 stored off-site and for paper-based records 18. When notification is received that off-site and paper records have been destroyed, the Records Manager will update ILM database 13 and the activity will be logged to the audit file 9. After a purge is completed, the system will initiate a new backup process (via backup module 8) and affected system catalogues 16 will be synchronized to reflect the new version information.

When disposal occurs for records which are stored on permanent media (e.g., WORM platters), special handling is required to remove the stored sub-documents from the system. In accordance with this process, sub-documents stored on permanent media are removed by first creating a temporary database table for all permanent (WORM) volumes which have sub-documents to be disposed, and verifying the path to that volume. Sub-documents to be removed from the permanent media are grouped on temporary database tables by platter (e.g., WORM01, WORM02, etc.). A check is then made to determine whether any of the sub-documents to be disposed is logically attached to another document or folder with a longer retention. If so, the document cannot be purged from the system.

Next, the contents of each affected platter are dumped to rewritable media (after the system has determined that sufficient storage capacity exists on the rewritable media). The records to be destroyed are then purged from the rewritable media (e.g. platter). After each affected permanent platter's contents are dumped to rewritable media, a system message is sent to the System Administrator to dismount and destroy the permanent platter. After each dismount, a system message is sent to the System Administrator to mount a new platter, which has been initialized with the same volume name and to which remaining platter contents are written after the system checks to verify that the volume name equals the volume identifier of the destroyed platter. If there are no remaining records to be written to the new volume, the mount message for the new volume will not be sent and the next platter to be purged will be mounted.

After all records are deleted from each rewritable medium, all associated database records related to that sub-document are purged from the database. In instances where all sub-documents (or all remaining sub-documents) in a case are being destroyed during the disposal process, all case-related information is purged from the database tables. The exception to this is where outstanding information exists concerning off-system sub-document versions which must be destroyed as part of the disposition process. When information is deleted from the database, as the transaction is committed, the table is overwritten.

This process continues until all affected permanent media has been rewritten with records not yet due for disposal. After the permanent media disposal is completed, the system deletes all selected images or electronic records and associated database information stored on rewritable media, making the space available for storage of other information. Deletion of images or electronic files and SQL database information for those files is done on a one-for-one basis for images and electronic records stored on rewritable media. All records purged from the system are logged for audit purposes as the files are deleted from the temporary media and reports concerning disposition are available from the system.

Another method of purging records stored on permanent media involves building the temporary database table for all WORM platters with contents to be disposed and verifying the path to the volume. Sub-documents to be removed from each platter are then grouped by platter and a check is made to determine whether any of the documents to be disposed are logically attached to a document, folder or case with a longer retention. If so, the sub-document cannot be disposed of during the process.

After the contents of each permanent platter have been checked, the records to be saved are written to temporary storage and a check is made to ensure that only records to be retained have been written. A message is then sent to the operator to remove and destroy the platter and to mount a new WORM platter in its place. The contents of each WORM platter which are to be retained after the disposal process are then rewritten to a new WORM platter.

Centralized Automated Records Archival

Another implementation of the present invention involves an automated "warehouse" facility for paper and electronic records. Such a facility can be accessed on-line from external organizations and provides for the automated transfer of requested information stored on behalf of the external entities.

From time to time, organizations audit records stored off-site in warehouse facilities, such as facilities managed by Pierce Archives. Although the number of "lost" paper records may not be significant in relation to the number of records stored at the facility, some number of boxes of records are generally lost or misfiled due to the manual nature of the storage procedures used in most such facilities. Also, many current archival facilities which are well-organized, clean and climate-controlled for proper storage conditions are mainly for "dead" storage. Such facilities cannot handle a significant volume of recall/drop-off/delivery requests, such as those generated by large organizations or entities. Other facilities which are less organized and controlled for proper archival of records are better staffed to handle volume drop-off/recall requests.

Using the ILM system according to the present invention, an automated archival facility for paper and electronic records is the "next generation" of archival storage and provides for storage of retained paper documents and microfilm/microfiche as well as records stored in electronic formats. The present invention can be utilized by organizations whose records archival needs are more active than "dead" (i.e., record recall requests will be frequent enough to warrant on-line access to the archival facility).

A facility according to the present invention will handle an organization's total requirements for records management (active and dead storage). The facility is accessible through an on-line system, which will validate and process requests for archived information and forward requested data electronically or by other physical means to the requesting organization.

Due to the sensitive nature of information stored in this facility, on-line requests can be made, through a system terminal in the requester's own facility, only after a smart card or other access key is properly placed into the terminal receptor. This access key for example, will perform the following functions: (1) turn on the terminal and attached microcomputer; (2) validate that the request for archived information is within the bearer's archival access authority (contained on the card); (3) update the card database with the information access request; (4) establish a telecommunications link with the archival facility; and (5) send information concerning the information access request to the archival facility.

If the request for information is rejected during the card/terminal operation, the access card holder will receive a "Not Authorized" message, and the invalid access attempt will be updated on the access card database. If a sufficient number of invalid access attempts are made using any single card, the card will also be invalidated for access until a revalidation routine is performed on the card by an authorized agency.

When a previously validated access request is received in the archival facility, a system terminal at the facility will display the identity of the requester, the requesting organization, the records requested, media and location, as well as the desired mechanism for forwarding the information (on-line transmission, courier, etc.) to the requester. Data transmitted by the facility to client sites may be encrypted as part of the transmission process. One or more encryption keys will be made available to clients for data decryption prior to reading or processing at the client location. The decryption process will be undertaken by an authorized individual at the client site.

An archival facility database will track requesters and data requests, along with archived records, media and locations. This information will periodically be fed through a neural network system which will assist in the management of record archival media and location for ease of access and forwarding.

As requested by its clients, the facility will arrange with an outside vendor(s) to do conversion of paper records or microfilm or fiche to optically-stored images. In addition, records retention information for those images may be added at the facility upon request.

Pierce Archives, for example, offers, as part of its service to customers, an on-line system to allow a customer to review records archived, box locations, make record retrieval and destruction requests and allow ordering of record cartons. This service, accessible from a stand-alone microprocessor or personal computer, supplements monthly activity reports sent by Pierce to warehouse clients. The automated facility according to the present invention provides the following additional services: (1) added security through remote access key validation prior to contact with the archival facility; (2) management of electronic information across all formats and media, in addition to storage and management of paper and microform records; (3) capability of providing a total records management solution, not just archival warehousing of records; (4) capability of providing, through business relationships, document/ microform conversion and index and records management information entry; (5) multiple retrieval options, including electronic transfer of information to a requesting customer; and (6) active, continuous, physical archival management, utilizing technology (e.g., neural network monitoring of data/paper access frequency) to optimize record locations (e.g., change jukebox platter locations or move physical records to more accessible locations) and facilitate retrieval.

The archival facility, according to the present invention, will also provide a solution to the following problems experienced with current records archival companies: (1) inaccurate inventory of archived record cartons; (2) time-consuming and costly research process required to locate old records due to lack of itemized knowledge of carton contents; (3) lack of follow-up tracking or information available on records recalled from archival, including up-to-date retention and destruction schedule data; (4) time delays in recalling archived information from the off-site facility; and (5) inability to manage all business records through a single system.

Although these issues are less important for organizations whose archived records are "dead" (i.e. seldom if ever recalled), previous Records Management studies have shown that at least 25% of inactive paper records, for example, are recalled on a regular basis.

ILM System Remote Operation with SmartCards

Figure 6:
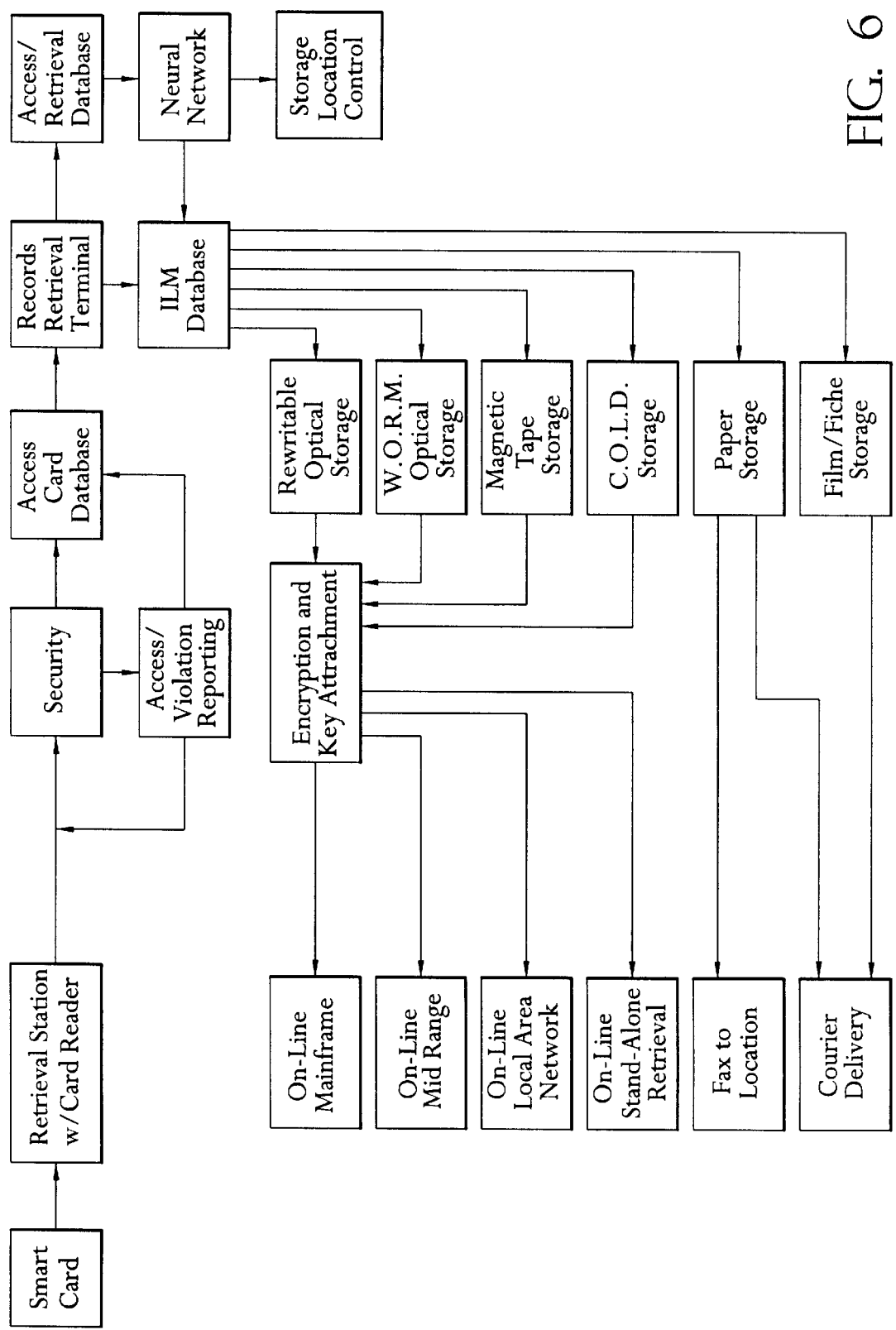
FIG. 6 is a logical schematic view illustrating a further implementation of the present invention in an automated records archival facility providing on-line access (local or remote) to, and retrieval of, archived records (both on-line and off-line).

Referring to FIG. 6, an alternative method of implementing the ILM system will now be described.

In this figure, the ILM system is used to run a remote information archival application, which houses information belonging to multiple organizations and is accessed by authorized representatives of those organizations through a retrieval station 7 containing a smart card reader. Authorized individuals wishing to request access to stored information from the archival facility place their smartcard access key 36 in the reader in their organization. The card turns on the terminal 7, validates the card bearer's access authority from the card access database 20, updates the information retrieval request on the card database 38; establishes a communications link with the archival facility; and sends data concerning the information request to the archival facility.

Information requests not within the card bearer's authority will receive a "not authorized" message and the invalid access attempt will be updated (block 39) to card database 38.

Valid retrieval requests will be routed to the terminal 7 at the archival facility and will display the requester, requesting organization, requested records, media and location, as well as forwarding information (on-line transmission, courier, etc.).

Retrieval request information will be written to an access/retrieval database 41. The system will query ILM database 13, which will route the retrieval request to the appropriate storage media (18, 31, 19). Periodically, request and location database information will be fed through a neutral network system 36, which will determine the most viable location for information and media storage (based upon frequency of access, etc.) for ease of retrieval and update the consolidation database 37 accordingly.

Data to be transmitted to the requester is, preferably, first encrypted and an encryption key 34 is attached to allow for decryption at the receiving location. The information is then forwarded to the requestor's waiting business applications (5A, 5B, 5E), to a stand-alone retrieval (viewing) station (7), faxed to a specified number (32) or sent by courier (33), if requested.

Figure 7:
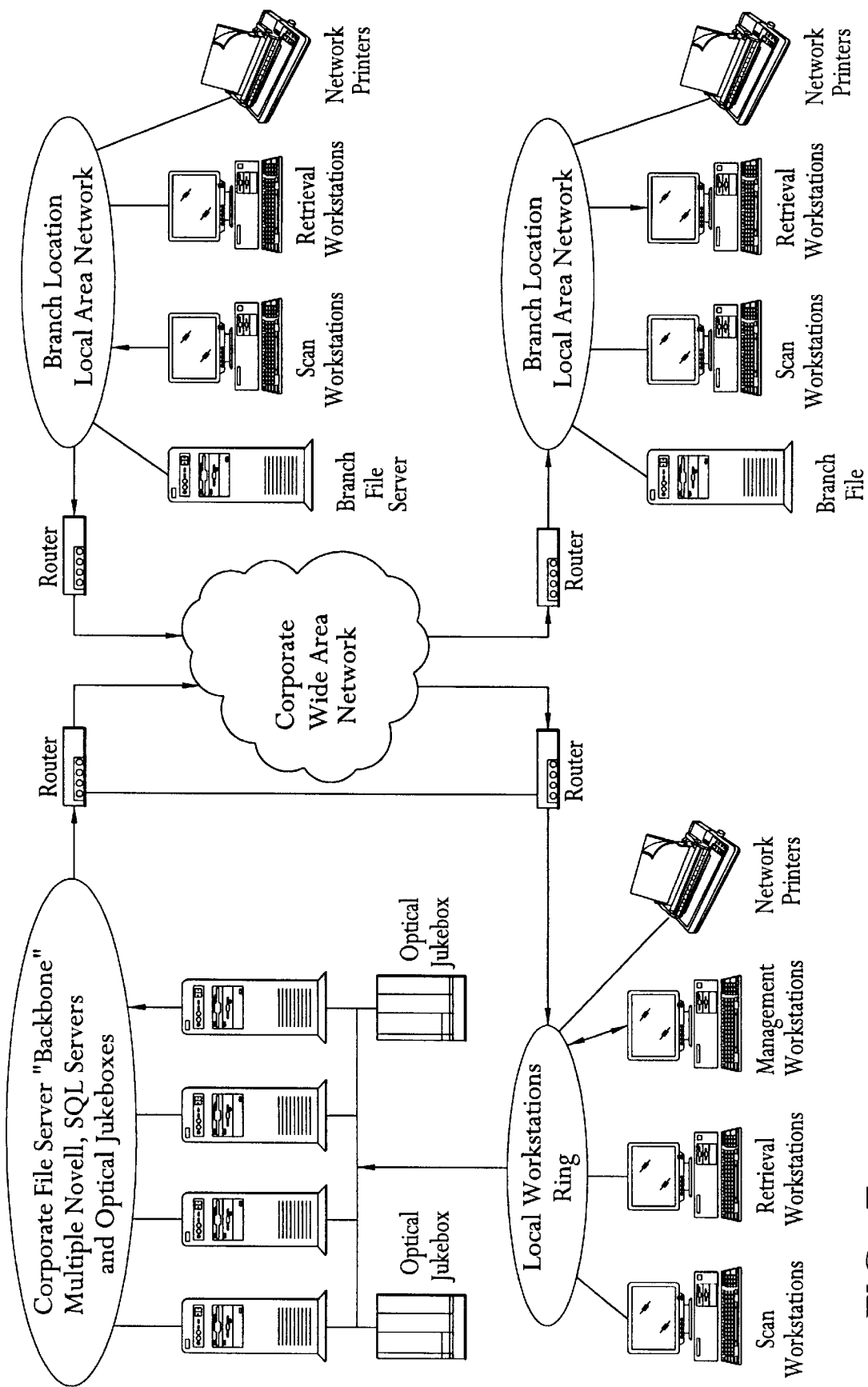
FIG. 7 is a schematic view illustrating the hardware, software and network connectivity associated with an implementation of the present system in a large enterprise having numerous branch locations connected via a wide area network (WAN), with a centralized storage of information at the corporate headquarters.

Sample System Configuration Showing an Enterprise Implementation with Branch and Central Corporate Locations Referring to FIG. 7, there is shown another exemplary system configuration. In this sample implementation, documents are scanned into the system by a scan workstation in a branch location and sent (see arrow 1) to temporary storage where the documents are saved. The information is passed, through a router 2 located at the branch location, to the Wide Area Network 3. The information is received at a router 4 in the corporate office and stored temporarily on a file server, which may be a Novell file server. At the corporate office the records are recalled from the file server 8 by a management workstation 6 connected to a local area network ring 7 and routed via routers 10 and 4 to the management workstation for certification.

Certified records may then be requested by a second branch location retrieval workstation 13. In response to the request, images are routed from file server 8 to a router 9 and into the Wide Area Network 3. The images are received via a router 11 at the branch location and routed to the Local Area Network 12 for passing to retrieval workstation 13 for viewing.

Sample Filing Structure for Paper-Based Information

FIG. 8 represents a sample filing structure which may be used for filing, storage and retrieval of paper-based (scanned images) documents or electronic documents (e.g., spreadsheets, word processing files, etc.) which are generally handled for filing and retrieval in the same manner as paper-based files are handled.

The elements of this structure include a cabinet 42, which represents a physical storage location; a case type 43, which represents a type of file, such as a claim or a contract; cases 44, which represent specific instances of the case type, such as specific claims or contract files; folders 45, which represent logical filing units within the cases; documents 46, which represent individual documents (or groups of records) stored within the folders; and sub-documents 47, a further definition and breakdown of information stored within documents. The last unit of case-based files is the page 48, which represents a specific scanned image or electronic record. This unit has been defined, for example, as a record data unit. The sample file structure mimics a paper file stored within a separate folder.

Other System Features

The ILM system of the present invention is an integrated tool which combines the features of an electronic document management system with true Records Management capability and sensitivity to and support for the issues of the legal admissibility and discoverability of records and electronic records-related regulatory compliance issues through built-in system features. These and other unique features of the present application which distinguish the system from other available products are now explained in some detail.

Automated Support for Legal Admissibility of Stored Records

System Integrity

The system of the present invention is a self-checking system. When a user signs on to any of the main system functions from the Main Menu (Scan, Retrieve, Management Services or System Services), a system integrity test is run, checking the status of that user's workstation (hard drive, CPU, network connection), as well as the network printers, system servers, optical storage devices and database integrity. A status dialog box on the screen shows the progress of the system self-check to the workstation user. Results of this test are returned and logged to a table on the database. This built-in diagnostic provides the answer to the customary admissibility question, "How do you know that the system which produced these records was working properly?"

The System Integrity function can also be run by authorized system users from the Main Menu at any time. This function provides a printed record of the integrity check results.

Audit Logging

All significant functions performed on the present system are logged for audit purposes to tables on the database, with such information as the login ID and workstation of the user performing the function and the date and time the function was performed. In addition, no record deletions or modifications to the retention data of stored records may be performed without first indicating the reason for the deletion or change. The reasons are also written to the audit log file.

All records printed by the system are logged, with the ID and workstation ID of the individual who printed the record and the date and time the print was done. This extensive logging is useful for troubleshooting and activity verification. More importantly, the logging may also be valuable in the event it becomes necessary to prove to a court of law or regulatory body that some activity did not occur (records may be used to prove the negative as well as the positive). In addition, back-up support for any deletion of records "outside the normal course of business" (which may raise a flag if discovered during litigation or pre-trial discovery) is noted within the system itself.

System Audit Function

The System Services portion of the present invention contains a feature which allows an external individual(s) to audit stored files (image and non-image records) by building a list of files in one or all case types and selecting individual files, folders, documents, sub-documents and pages to view in the Audit function viewing window. In addition to the images or electronic files, the auditor may view all index and retention period information and determine whether annotations have been added to the individual sub-document page(s).

After viewing, the auditor may place a Pass or Fail flag on the sub-document, which will cause a Last Audited date field to be filled by the system. This date is used to verify that an audit has occurred and also to select cases and sub-documents for the next audit pass. Closer scrutiny of selected cases may be done by noting the selected files and viewing them using the retrieval function prior to setting the audit flag indicator. Cases for audit may be selected through a reference to the Last Audited date field (e.g., select all cases not audited since . . . ).

This feature provides the organization with an automated manner in which to periodically inspect its electronic records and provides an answer to the admissibility question: "How often is the system which produced these records audited?" since it can be shown that business records are consistently checked for accuracy and that established procedures are consistently followed by system users. The system reports function provides several pre-defined audit reports for use by the system auditor. Specific audit criteria for each organization are developed within that organization to conform to internal policies and procedures.

Electronic Document Import/Export

Electronic documents, other than scanned images (e.g., electronic mail messages, facsimiles, word processing documents), may be imported into the present system, from a user workstation using the Import Utility and saved as part of an official business record within a system file. Although these documents remain in modifiable format and can be copied for export out of the system, they may not be modified from within the application and none of the originating applications (e.g., Excel) can be launched by the present system. This helps ensure the integrity of saved file contents. The ability to make working copies of saved electronic files is limited to specific system users through system security.

Version, Media and Duplicate Management

The present system provides for the tracking of sub-documents which have off-system duplicates or for which off-system duplicates have been created through printing of imaged documents or the export copying of electronic files stored within the system. In the last two instances, the location is recorded automatically by the system to a Media Locations table. When stored system records are backed up for recovery purposes, information concerning the backup is written to a Backup Log.

For other copies or duplicates of the sub-document not created through the system, the Records Manager may enter the information into the Media Locations table for tracking. The system tracks both the media on which the sub-document is stored and the physical location of that record. This is done to facilitate the simultaneous (manual) destruction of all outstanding copies of the sub-document at the end of the retention period.

When the disposal process is performed, it is necessary to run a new full backup of both the database and stored image and electronic files and to dispose of prior backups to ensure continuing integrity of scheduled retention information. After the disposal process, the prior backup is maintained only until it can be verified that no records were purged in error.

The electronic record export facility allows an authorized system user to create a copy of the stored file and import it into an application for modification. The present system will not launch that application (to prevent accidental overwriting of previously certified information) and requires that any other "versions" of the electronic records be separately saved and certified into the system. This allows the reuse of electronic documents or records without compromising information stored within the system.

The present invention may be implemented in accordance with any suitable programming language and run on any operating system. The operating environment for controlling the storage of images and electronic files may be Novell Netware (Token Ring or Ethernet), or Windows NT. For a current Microsoft Windows NT implementation, an interface ("thunking") layer handles the 16 bit to 32 bit conversion of calls and parameters. Other implementations can include OS/2 and Unix.

Four or more main functions and a number of utilities are accessible through a Main Menu. The Main Menu contains icons for all functions and utilities available and "bubble help" for each icon to assist the user in navigating beyond the menu. Functions and utilities not accessible to a specific system user are disabled at the Menu screen when the user signs on to the system. The main functions are further described as follows:

Scan and Index

This is a restricted access function which allows a user to enter information into the system through a number of industry-standard scanner devices, which interface to the scan function through the Kofax imaging engine.

A Kofax board (and software) is installed in any workstation utilizing the scan function. This board provides connectivity with the scanner device and handles image compression and decompression. Kofax is considered an industry standard imaging vendor. The present system incorporates, insofar as possible, industry standard hardware and software components coupled with its own proprietary application.

For case files to be stored within the system, the user may attach appropriate index information (search criteria) to imaged cases and sub-documents, organize documents for formal filing and retrieval and save the images to a temporary network storage device.

These images may be placed into a newly-created local filing unit (i.e., case) or appended to existing information within the system. Images are compressed by the imaging engine prior to saving on network storage to minimize impact on network traffic and file server storage. The system may be placed for scanning in automatic system mode, which creates or retrieves case information and scans documents into the created or retrieved case, or in step by step mode, which requires the scannist to scan first and then process case information in a strictly controlled sequence of events.

Through this function, the scannist may toggle to an "in-bound queue", allowing the scannist to index and place (file) uncertified electronic documents or files that have not been scanned but are incoming by means of being placed into the Import Utility by authorized individuals. Such "documents" include, among others, facsimiles, electronic mail messages, spreadsheets, word processing files and other ASCII files. These documents may be viewed by means of a generic viewing utility, organized and filed together with imaged documents in appropriate case files.

Documents may be scanned in black and white or in color into the system on a case basis or batched with separator sheets for high-speed scanning and handling of batches. The system allows saving of batched pages on network storage to allow for separation of scanning and indexing functions. All functions of the selected scanner, including resolution setting and halting the scan process if necessary, are controlled through the application itself and do not require physical manipulation of the scanner device.

Documents incorrectly scanned (e.g., folded or bent) or improperly (unnecessarily) scanned may be deleted prior to the save process. For indexed files (not saved batches), entered search criteria will be updated to the database when the case is saved to temporary network storage. For batches, only batch information will be saved to the database during saving to network storage.

Landscape documents which have been scanned into the system as portrait documents may be flagged as landscape for ease of later viewing without the necessity of rotating the image(s). The scan function has access to messaging as well as the bullet annotation feature of the system. Scan may be minimized to allow for simultaneous running of other applications.

Imaged documents are compressed as they are scanned into the fixed disk of the scan workstation by the hardware portion of the imaging engine. Saved (imaged) documents are preferably sent in compressed form over the network and stored in temporary storage as compressed images.

System Services

This function allows the System Administrator to configure system options, to handle security, set the database backup schedule and to access the pre-defined reports menu. System Services is the day-to-day administrative function handler for users and contains the system audit function. System Services functions include:

Security:

The security function allows the System Administrator to define user security profiles, which include functional access rights and stored information access levels. The user may be given access to any or all of the four main system functions and the system utilities. Retrieve, Management Services and System Services are broken down and access to these sub-functions is also given within Security.

At any time the System Administrator may determine what functional access has been granted to a specific user by clicking on the Quick Rights button, which produces a listing of all system features to which the user has access. The access rights for each system user are set up within the Security function, as a security access range (for example, 0 to 999) which conforms to security levels given to cases, folders, documents and sub-documents which are set up within the system. The user is assigned a low range and a high range and is allowed, for example, up to ten range exceptions (security classes outside the main access range to which the user has access). Case information, cases, folders, documents and sub-documents which are not included within either the access range or the range exceptions may not be retrieved by the specific system user. Associated with each user is location information, which defines the portion of the organization to which that user belongs. This feature allows the system to be used by the enterprise, whether or not the enterprise is defined as a single or multi-company organization.

Passwords are set up within the user profile by the System Administrator and must be modified at sign-on by all system users on a pre-defined basis (e.g., every 30, 60, 90, etc. days). Passwords are encrypted within the system and are not viewable at any time (encryption may be based on a DES algorithm or other algorithm known in the art such as PGE, RSA, NIST or the like; for example, the password is encrypted twice and the results of that encryption are converted to a numeric string). The Login ID is set up within the system to equal the network (e.g., Novell) Login ID and is never entered by the user during the login process to the present system. The system checks the User Table to determine that the Login ID which corresponds to the entered password equals the Novell Login ID. Where a difference is detected, login access to the present system will be denied.

Repeat use of passwords by users of the present system is discouraged, as the system tracks the current password and the three prior passwords used and will not allow any of these passwords to be entered during the password change dialog. The use of trivial passwords (e.g., "AAAAAA") may also be prohibited.

Options:

Options is divided into the System Audit function (previously described) and Configuration Options. Configuration Options include the set-up of a General Queue for workgroup messaging and the set-up of outbound faxing for selected users with the proper equipment installed at the workstation.

Set Backup Frequency:

The system allows authorized users to set the date, time and frequency of database backup. Where no settings are made, the system defaults to a backup at 24:00:00 daily.

Reports:

The System Administrator is allowed access to a full, pre-defined menu of reports. Reports fall into three categories: Management Reports, which contain information required for the Records Manager to handle the Management Services function; Audit Reports, which contain reports used by the external or internal audit individual who uses the System Audit function; and System Reports, which include system activity logs and other reports required by the System Administrator. Reports are point and click (report runs immediately after clicking on the icon next to the desired report name) and some reports allow the entry of a date range to limit report output. When the report is run, an on-screen formatted report is immediately created; printing the report, if desired, is an option. Several navigation icons allow the report requester to navigate through the pages of the on-screen report. Ad hoc reports may also be created using a report utility program.

Management Services

The Management Services function allows authorized individuals to handle all system set-up and processing functions associated with the Records Management portion of the system, including Records Administration (which includes the certification process previously described); Disposal; Types (set-up of the case-related filing structure including cases, folders, documents and sub-documents, with associated retention and security class information); Cabinets (defining storage locations and the path information for that location); and Bullets (which allows the Records Manager to define what icon status indicators may be associated with cases stored in the system). Management Services contains many unique features of the present invention.

Records Administration:

The main function of Records Administration is the certification of sub-document information to be stored within the system and made available for retrieval by authorized users. Certification is performed in one of the available system modes of Records Administration, i.e., uncertified mode. While the images or electronic files are uncertified, they are stored in temporary network storage and are unavailable for retrieval at the, workstation. During certification, stored records are moved by the system from temporary storage and placed in their pre-defined permanent location. Also, during certification, the system uses the retention period (for example, in months) and the certification date to calculate the disposal date for sub-documents having date-driven retention. Certification is a quality control process performed on most case-related information. Large numbers of computer-generated records being filed within the application at one time may be sent through as pre-certified records.

After certification, the Records Manager may still work with the case file contents by accessing certified mode. In certified mode, the Records Manager may view index information, attached bullets, media locations and retention information and has the following available options: (1) delete page or sub-document (a reason must be entered for audit purposes); (2) transfer page or sub-document (move from one case, folder or sub-document to another, including movement between storage cabinets); (3) copy page or sub-document (logically attaches a stored page or sub-document to more than one sub-document or document, across cases and folders, so that when any of these cases, folders or documents are retrieved, the copied page or sub-document will also be retrieved); (4) add/delete media locations (add or delete references to copies of sub-documents which are stored on media and in locations outside of direct control of the system to help ensure complete file disposition of all copies at destruction time); and (5) modify retention period (change the default retention information set for the sub-document at the time of certification; a reason must be entered for audit purposes).

The Records Manager also has the opportunity to rotate images as they are displayed. Electronic (non-image) files cannot be rotated but may be viewed by using scroll bars.

Prior to being certified, data streams, sub-documents or uncertified sub-document pages may be placed by the Records Manager into Hold status until problems or questions can be resolved and certification or deletion can be done.

The Records Manager may access the hold mode to review and certify sub-documents which have been previously placed on hold. Data, sub-documents or pages in hold mode may also be deleted or left in hold mode upon exit.

Sub-documents which, for internal, legal or regulatory reasons, are excepted from the normal disposal cycle when they present themselves for destruction, may be recertified if the Records Manager wishes to modify retention information and so indicates during the disposal dialog. All such sub-documents are then flagged for recertification and will automatically present themselves when the Records Manager accesses the recertified mode of Records Administration. The Records Manager may then alter the retention information and certify the sub-document(s), after entering a reason for the change for audit purposes. The system will recalculate the disposal date based on the newly entered retention information. Whenever the retention information is modified, the system presents the Records Manager with the default retention information and the last entered retention for comparison purposes.

When the only information concerning a case in the system is information concerning off-system Media Locations or when the Records Manager wishes to add or delete Media Locations information without the performance overhead of retrieving and displaying images or files, the Records Manager may access the "media only" mode of Records Administration. The same functionality is presented in this mode as in certified mode, except that images or electronic files will not be displayed. When all images or electronic files have been purged from the system and all Media Location information deleted by the Records Manager, all database information will be purged from the system after the deletion is logged for audit purposes.

The following utilities are accessible from within the Records Administration function: (1) Send Fax; (2) Send A Message; (3) View Message; and (4) Print.

Disposal:

This function (described above) may only be accessed by authorized individuals. In brief, its main functions are to: (1) build and finalize disposal lists; (2) verify copied pages/files; (3) write temporary database tables; (4) purge and rewrite permanent (WORM) media and associated database data; (5) purge erasable (DASD or rewritable optical) media and associated database data; and (6) write, for audit purposes, a disposal log for all sub-documents, etc. deleted from the system.

After this process has been completed, it is necessary to manually determine that no records have been purged in error and then to complete a new full system backup, destroying any prior backups. This will preserve the integrity of the disposal process. Sub-documents marked "Do Not Delete" may not be purged during the disposal function. The Records Manager may, however, view any descriptive text entered when the marking was attached to the sub-document.

When the Records Manager exits the disposal function and has excepted records from the purge, he will be asked whether the records are to be recertified. A "yes" answer will place the excepted sub-documents in the queue for recertification.

Types:

This set-up function allows the Records Manager to create within the database the filing structure for the storage of case-related information within the system. Types to be defined include Cases, Folders, Documents and Sub-Documents. Any associated index information is defined for cases and sub-documents when they are defined to the system and sub-document retention is set when the sub-document type is defined under the appropriate document type.

Retention types include (1) date-driven retention (a period in months is assigned at certification (or a default is used) and the sub-document is destroyed at the end of the period); (2) event-driven retention (retention will not begin until a specific event, e.g., termination of an employee or cancellation of a contract or policy, has occurred; the entry of the event date will trigger the beginning of the designated retention period); or (3) replacement retention (a document or file will remain within the system until a replacement of the same type is filed, at which point the first document on file will become available for disposal).

No Case, Folder, Document or Sub-Document type may be deleted from the system if images or electronic files stored in the system are associated with that type until all images and electronic files have been deleted or transferred.
Cabinets:

This set-up function allows the Records Manager to define locations controlled by the system where images and other electronic records and files are to be stored, both on a temporary basis (prior to certification) and a permanent basis (after certification).

Information created during the set-up of cabinets includes the purpose; DOS path used by the system to locate stored information; and the amount of storage remaining before the system issues a warning message that the cabinet is nearly full. A cabinet in which information has been stored may not be deleted from the system until all stored information has been transferred or purged.
Bullets:

Bullets are set up for case types within this function. A group of icons is available to the Records Manager, who assigns bullet icon status flags to specific case types and assigns a name to the bullet annotation. Other properties of the bullet (e.g., the bullet may be assigned at case level or image level, bullet name may be displayed over images to which the bullet is attached, etc.) are defined at this time also. A bullet icon may not be attached to an image or case within a specific case type unless it has been previously set up by the Records Manager.

System Utilities

In addition to the main four functions, a number of utilities are available in the present system, either from within some functions or from the Main Menu. These include:

Send A Message

The messaging utility is available to be run from the Main Menu. Send a message can be used to send messages to an individual user queue or to the general queue for workgroup handling.

System Integrity

This function is the same as that run automatically when users sign on to any of the four main functions. System integrity is checked and logged, except that results are printed as well as logged for audit purposes.

Run System Backup

Access to this function is restricted. When this function is accessed, the system prepares to run the ILM backup at the pre-selected date, time and frequency.

Run System Restore

Access to this function is restricted. When this function is executed, it begins an immediate rebuild of the ILM database, into which data is restored from a defined, prior database backup. This function is used to resolve database problems and purges all existing database information.

General Queue

This function allows a user to access the general message queue. Messages sent to this queue may be accessed by authorized users, who may "assign" a message to their own queue for handling. This queue may be used for assignment of case work within a group performing the same work tasks.

Search Utility

The facility, which may also be accessed from within the retrieval function, allows a user to enter one of two search criteria fields and search the ILM database, either within a case type or across all case types within the system. The resulting list is displayed and may be printed, if necessary.

Import Utility

This utility allows a user to select electronic files to which he has access and to send the files to the scan application for importation and filing.

There has been disclosed a system which meets the objectives first described. Other variations and embodiments may come to mind from a careful reading and study of the system description and drawings. The present invention should only be considered to be limited in scope by the claims which follow.

We claim:

1. A computer based records management system, comprising:

first input means for receiving record data units representing and/or relating to records presented for possible retention, said first input means including indexing data receiving means for receiving indexing data relating to said records presented for possible retention, and storing said indexing data in said third data storage means;

first data storage means for temporarily storing record data units received by said input means;

verification/certification means for verifying/certifying the suitability for retention of the record data units temporarily stored in said first data storage means;

second data storage means for storing record data units that are verified/certified for retention by said verification/certification means;

retrieval means for allowing a user to retrieve record data units stored in said second data storage means;

third data storage means for storing a record of record data units received by the first input means and disposal schedules for record data units stored in said second data storage means; and disposal means for disposing of record data units stored in said second data storage means in accordance with the stored disposal schedules.

2. A computer based records management system according to claim 1, wherein said indexing data receiving means comprises means for input by a user of indexing data relating to said records presented for possible retention.

3. A computer based records management system according to claim 1, wherein said indexing data receiving means receives indexing data relating to records to be stored off-line.

4. A computer based records management system according to claim 3, wherein said indexing data receiving means receives indexing data relating to hard-copy documents, including a storage location of said hard-copy documents.

5. A computer based records management system according to claim 3, wherein said indexing data receiving means receives indexing data relating to records stored on off-line computer readable data storage media, including a storage location of said data storage media.

6. A computer based records management system according to claim 1, wherein said indexing data receiving means receives indexing data from said record data units.

7. A computer based records management system according to claim 1, wherein said first input means further comprises record converting means for converting records presented for possible retention into a computer recognizable form.

8. A computer based records management system according to claim 7, wherein said record converting means comprises a document scanner.

9. A computer based records management system according to claim 7, wherein said record converting means comprises a system for converting audio records into a computer recognizable form.

10. A computer based records management system according to claim 7, wherein said record converting means comprises a system for converting video records into a computer recognizable form.

11. A computer based records management system according to claim 1, wherein said first input means comprises an electronic mail receiving system.

12. A computer based records management system according to claim 1, wherein said first input means comprises a facsimile receiving system.

13. A computer based records management system according to claim 1, wherein said verification/certification means generates a message to prompt a user to verify/certify the suitability of temporarily stored record data units for retention.

14. A computer based records management system according to claim 1, wherein said verification/certification means performs an automatic verification/certification of record data units based upon preset criteria, and updates the third data storage means to reflect the verification/certification of record data.

15. A computer based records management system according to claim 1, wherein said third data storage means stores record disposal schedules included in the record data units received by said first input means.

16. A computer based records management system according to claim 1, wherein said disposal means comprises a second input means allowing a user to input disposal schedules for storage in said third data storage means.

17. A computer based records management system according to claim 1, wherein said disposal means generates a message to prompt a user to confirm those records to be disposed of in accordance with the stored disposal schedules.

18. A computer based records management system according to claim 17, wherein said confirmation means further provides a user with an option to delay or suspend disposal of records scheduled for disposal.

19. A computer based records management system according to claim 1, wherein said second data storage means comprises on-line storage media located on a plurality of hardware/software platforms interconnected by an area computer network.

20. A computer based records management system according to claim 1, wherein said stored disposal schedules comprise one or more of: version based schedules, time based schedules, source based schedules, type based schedules and use based schedules.

21. A computer based records management system according to claim 1, wherein said disposal means generates a message indicating a need to dispose of off-line records in accordance with the stored disposal schedules, and allows for user input to verify disposal of off-line records, said third data storage means being updated to reflect said user input.

22. A computer based records management system according to claim 21, wherein said disposal means periodically generates a status report containing a list of off-line records due and overdue for disposal, said status report being periodically updated to reflect said user input to verify disposal of off-line records.

23. A computer based records management system according to claim 1, wherein the disposal of records by said disposal means comprises an erasure of the record data units corresponding to documents scheduled for disposal, in addition to a deletion of pointers to the storage locations for such record data units.

24. A computer based records management system according to claim 1, further comprising information filtering means for categorizing record data units for further processing.

25. A computer based records management system according to claim 24, wherein said information filtering means identifies incomplete and/or redundant record data units prior to any passage of said record data units to said verification/certification means.

26. A computer based records management system according to claim 24, wherein said information filtering means serves to route record data units to their designated destinations.

27. A computer based records management system according to claim 26, wherein said information filtering means routes record data units to designated user work stations prior to any passage of said record data units to said verification/certification means.

28. A computer based records management system according to claim 26, wherein said information filtering means routes record data units to designated business application programs prior to any passage of said record data units to said verification/certification means.

29. A computer based records management system according to claim 26, wherein said information filtering means serves to identify record data units requiring special handling prior to any passage of said record data units to said verification/certification means.

30. A computer based records management system according to claim 26, wherein said information filtering means tags record data units passing therethrough so as to indicate which record data units are to be passed on to said verification/certification means.

31. A computer based records management system according to claim 30, wherein said tags further enable location, copy and version tracking of the record data units in the system.

32. A computer based records management system according to claim 31, wherein said first data storage means comprises capture means for capturing location and version tracking information and passing said information on for storage in said third data storage means.

33. A computer based records management system according to claim 24, wherein said information filtering means serves to send any required acknowledgements of receipt of record data units.

34. A computer based records management system according to claim 1, further comprising audit means for making a record of processing actions of the system.

35. A computer based records management system according to claim 34, wherein said audit means makes a record of actions taken by said information filtering means.

36. A computer based records management system according to claim 35, wherein said record of actions taken by the information filtering means includes a listing of one or more of: recipients of record data units, acknowledgements of receipt of record data units, non-delivered record data units, record data units being held, and record data units requiring special handling.

37. A computer based records management system according to claim 34, wherein said audit means makes a record of actions taken by said verification/certification means.

38. A computer based records management system according to claim 34, wherein said audit means makes a record of actions taken by said disposal means.

* * * * *